(12) United States Patent
Cooley et al.

(10) Patent No.: US 11,634,998 B2
(45) Date of Patent: Apr. 25, 2023

(54) WASTEGATE ASSEMBLY FOR USE IN A TURBOCHARGER AND SYSTEM INCLUDING THE SAME

(71) Applicant: BorgWarner Inc., Auburn Hills, MI (US)

(72) Inventors: Matthew Brian Cooley, Asheville, NC (US); Alexander George Milburn, Asheville, NC (US); Kai Tanaka, Mills River, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/283,043

(22) PCT Filed: Oct. 4, 2019

(86) PCT No.: PCT/US2019/054613
§ 371 (c)(1),
(2) Date: Apr. 6, 2021

(87) PCT Pub. No.: WO2020/076619
PCT Pub. Date: Apr. 16, 2020

(65) Prior Publication Data
US 2021/0348520 A1 Nov. 11, 2021

Related U.S. Application Data

(60) Provisional application No. 62/742,722, filed on Oct. 8, 2018.

(51) Int. Cl.
*F01D 17/14* (2006.01)
*F01D 17/10* (2006.01)
(Continued)

(52) U.S. Cl.
CPC ......... *F01D 17/145* (2013.01); *F01D 17/105* (2013.01); *F01D 25/162* (2013.01);
(Continued)

(58) Field of Classification Search
CPC .... F01D 17/105; F01D 17/145; F01D 25/162; F01N 3/2006; F01N 3/2892;
(Continued)

(56) References Cited

U.S. PATENT DOCUMENTS 8,984,880 B2 * 3/2015 Marques ............... F01D 17/105
60/602
10,513,974 B2 * 12/2019 Uneura ................. F02B 37/186
(Continued)

FOREIGN PATENT DOCUMENTS

EP 2444625 A1 4/2012
EP 2044294 B1 8/2014
(Continued)

OTHER PUBLICATIONS

International Search Report for Application No. PCT/US2019/054613 dated Dec. 6, 2019, 2 pages.

*Primary Examiner* — Jesse S Bogue
(74) *Attorney, Agent, or Firm* — Howard & Howard Attorneys PLLC

(57) ABSTRACT

A turbocharger includes a turbine housing including an interior surface defining a turbine housing interior. The interior surface extends between a turbine housing inlet and a turbine housing outlet. The turbine housing also includes a wastegate duct disposed downstream of the turbine housing inlet and defining a wastegate channel. The turbocharger also includes a valve seat disposed about the wastegate channel, with the valve seat having a valve seat plane extending along the valve seat. The turbocharger further includes a wastegate assembly including a valve element (Continued)

engageable with the valve seat. The wastegate channel extends along a channel axis, and the channel axis is obliquely oriented with respect to the valve seat plane such that the wastegate channel and the valve element are configured to direct exhaust gas to a catalytic converter.

27 Claims, 12 Drawing Sheets

(51) Int. Cl.
  *F01D 25/16* (2006.01)
  *F02C 6/12* (2006.01)
(52) U.S. Cl.
  CPC ............ *F02C 6/12* (2013.01); *F05D 2220/40* (2013.01); *F05D 2240/50* (2013.01); *F05D 2260/606* (2013.01)
(58) Field of Classification Search
  CPC ........ F02B 37/025; F02B 37/183; F02C 6/12; F05D 2220/40; F05D 2240/50; F05D 2260/606; Y02A 50/20; Y02T 10/12
  See application file for complete search history.

(56) References Cited

U.S. PATENT DOCUMENTS

| | | | |
|---|---|---|---|
| 10,526,958 B2* | 1/2020 | Cooley | F02B 37/186 |
| 10,578,216 B2* | 3/2020 | Yanagida | F16K 1/2007 |
| 11,047,296 B2* | 6/2021 | Hoffmann | F02B 37/12 |
| 2007/0089413 A1 | 4/2007 | Green et al. | |
| 2013/0199175 A1* | 8/2013 | Hoshi | F01D 17/105 |
| | | | 60/602 |
| 2017/0152793 A1* | 6/2017 | Albrecht | F02B 37/183 |

FOREIGN PATENT DOCUMENTS

| | | |
|---|---|---|
| GB | 2528097 A | 1/2016 |
| WO | 2007138325 A2 | 12/2007 |

* cited by examiner

WASTEGATE ASSEMBLY FOR USE IN A TURBOCHARGER AND SYSTEM INCLUDING THE SAME

CROSS-REFERENCE TO RELATED APPLICATIONS

The subject application is the National Stage of International Patent Application No. PCT/US2019/054613 filed on Oct. 4, 2019, which claims priority to and all the benefits of U.S. Provisional Patent Application No. 62/742,722 filed on Oct. 8, 2018, which are hereby incorporated by reference in their entirety.

BACKGROUND OF THE INVENTION

1. Field of the Invention

The present invention generally relates to a wastegate assembly for use in a turbocharger.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Conventional turbochargers include a turbine housing. The turbine housing has an interior surface defining a turbine housing interior. The interior surface extends between a turbine housing inlet and a turbine housing outlet. Conventional turbine housings also include a wastegate duct disposed downstream of the turbine housing inlet that defines a wastegate channel in fluid communication with the turbine housing inlet for discharging exhaust gas from the turbine housing inlet by bypassing the turbine housing interior.

Conventional turbochargers also include a valve seat disposed about the wastegate channel at a wastegate channel outlet of the wastegate channel, and a wastegate assembly for controlling exhaust gas flow to the turbine housing interior. The wastegate assembly includes a valve element engageable with the valve seat. The valve element includes a valve body and a wastegate arm extending away from the valve body. The valve element is moveable between a first position and a second position. In the first position, the valve body is engaged with the valve seat for preventing exhaust flow from the turbine housing inlet to bypass the turbine housing interior. In the second position, the valve body is disengaged with the valve seat for allowing exhaust gas flow from the turbine housing inlet to bypass the turbine housing interior.

During movement of the exhaust gas from the internal combustion engine, it is required by federal law for the exhaust gas to flow to a catalytic converter to meet current emissions standards prior to exiting the vehicle into the atmosphere. However, conventional wastegate assemblies provide too low of velocity/flow of the exhaust gas to the catalytic converter, which results in the exhaust gas not adequately heating up the catalytic converter, particularly in cold start of the internal combustion engine. In such instances, undesirable emissions exit the exhaust system during warmup of the internal combustion engine and catalytic converter.

As such, there remains a need for improved flow of exhaust gas to the catalytic converter to prevent premature failure and improve operation of the catalytic converter.

SUMMARY OF THE DISCLOSURE AND ADVANTAGES

A turbocharger includes a turbine housing. The turbocharger receives exhaust gas from an internal combustion engine of a vehicle and delivers compressed air to the internal combustion engine, with the vehicle including a catalytic converter. The turbine housing includes an interior surface defining a turbine housing interior. The interior surface extends between a turbine housing inlet defined at one end of the interior surface and in fluid communication with the internal combustion engine and the turbine housing interior for delivering exhaust gas from the internal combustion engine to the turbine housing interior, and a turbine housing outlet defined at an opposite end of the interior surface and in fluid communication with the turbine housing interior for discharging exhaust gas from the turbine housing interior. The turbine housing also includes wastegate duct disposed downstream of the turbine housing inlet and defining a wastegate channel in fluid communication with the turbine housing inlet for discharging exhaust gas from the turbine housing inlet by bypassing the turbine housing interior. The turbocharger also includes a valve seat disposed about the wastegate channel at a wastegate channel outlet of the wastegate channel. The valve seat has a valve seat plane extending along the valve seat. The turbocharger further includes a wastegate assembly for controlling exhaust gas flow to the turbine housing interior. The wastegate assembly includes a valve element engageable with the valve seat. The valve element has a valve body and a wastegate arm extending away from the valve body. The valve element is moveable between a first position where the valve body is engaged with the valve seat for preventing exhaust gas flow from the turbine housing inlet to bypass the turbine housing interior, and a second position where the valve body is disengaged with the valve seat for allowing exhaust gas flow from the turbine housing inlet to bypass the turbine housing interior. The wastegate assembly further includes a spindle coupled to the wastegate arm of the valve element for moving the valve element between the first and second positions, with the spindle extending along a spindle axis. The valve seat plane is obliquely oriented with respect to the spindle axis such that the wastegate channel and the valve element are configured to direct exhaust gas to the catalytic converter.

Having the valve seat plane obliquely oriented with respect to the spindle axis allows the exhaust gas exiting the wastegate duct to be directed toward the catalytic converter, which ensures that the catalytic converter is adequately heated up, particularly in cold start of the internal combustion engine. Additionally, having the exhaust gas exiting the wastegate duct to be directed toward the catalytic converter reduces undesirable emissions from exiting the vehicle during warmup of the internal combustion engine and the catalytic converter.

In another embodiment, the turbocharger includes a turbine housing. The turbocharger receives exhaust gas from an internal combustion engine of a vehicle and delivers compressed air to the internal combustion engine, with the vehicle including a catalytic converter. The turbine housing includes an interior surface defining a turbine housing interior. The interior surface extends between a turbine housing inlet defined at one end of the interior surface and in fluid communication with the internal combustion engine and the turbine housing interior for delivering exhaust gas from the internal combustion engine to the turbine housing interior, and a turbine housing outlet defined at an opposite end of the interior surface and in fluid communication with the turbine housing interior for discharging exhaust gas from the turbine housing interior. The turbine housing also includes a wastegate duct disposed downstream of the turbine housing inlet and defining a wastegate channel in fluid communication with the turbine housing inlet for discharging exhaust gas from the turbine housing inlet by bypassing the turbine housing interior. The turbocharger also includes a valve seat disposed about the wastegate channel at a wastegate channel outlet of the wastegate channel. The valve seat has a valve seat plane extending along the valve seat. The turbocharger further includes a wastegate assembly for controlling exhaust gas flow to the turbine housing interior. The wastegate assembly includes a valve element engageable with the valve seat. The valve element has a valve body and a wastegate arm extending away from the valve body. The valve element is moveable between a first position where the valve body is engaged with the valve seat for preventing exhaust gas flow from the turbine housing inlet to bypass the turbine housing interior, and a second position where the valve body is disengaged with the valve seat for allowing exhaust gas flow from the turbine housing inlet to bypass the turbine housing interior. The wastegate channel extends along a channel axis. The channel axis is obliquely oriented with respect to the valve seat plane such that the wastegate channel and the valve element are configured to direct exhaust gas to the catalytic converter.

Having the channel axis obliquely oriented with respect to the valve seat plane allows the exhaust gas exiting the wastegate duct to be directed toward the catalytic converter, which ensures that the catalytic converter is adequately heated up, particularly in cold start of the internal combustion engine. Additionally, having the exhaust gas exiting the wastegate duct to be directed toward the catalytic converter reduces undesirable emissions from exiting the vehicle during warmup of the internal combustion engine and the catalytic converter.

In another embodiment, the turbocharger includes a turbine housing. The turbocharger receives exhaust gas from an internal combustion engine of a vehicle and delivers compressed air to the internal combustion engine, with the vehicle including a catalytic converter. The turbine housing includes an interior surface defining a turbine housing interior. The interior surface extends between a turbine housing inlet defined at one end of the interior surface and in fluid communication with the internal combustion engine and the turbine housing interior for delivering exhaust gas from the internal combustion engine to the turbine housing interior, and a turbine housing outlet defined at an opposite end of the interior surface and in fluid communication with the turbine housing interior for discharging exhaust gas from the turbine housing interior. The turbine housing also includes wastegate duct disposed downstream of the turbine housing inlet and defining a wastegate channel in fluid communication with the turbine housing inlet for discharging exhaust gas from the turbine housing inlet by bypassing the turbine housing interior. The turbocharger also includes a valve seat disposed about the wastegate channel at a wastegate channel outlet of the wastegate channel. The valve seat has a valve seat plane extending along the valve seat. The turbocharger further includes a wastegate assembly for controlling exhaust gas flow to the turbine housing interior. The wastegate assembly includes a valve element engageable with the valve seat. The valve element has a valve body and a wastegate arm extending away from the valve body. The valve element is moveable between a first position where the valve body is engaged with the valve seat for preventing exhaust gas flow from the turbine housing inlet to bypass the turbine housing interior, and a second position where the valve body is disengaged with the valve seat for allowing exhaust gas flow from the turbine housing inlet to bypass the turbine housing interior. The wastegate assembly further includes a spindle coupled to the wastegate arm of the valve element for moving the valve element between the first and second positions, with the spindle extending along a spindle axis. The wastegate channel extends along a channel axis, and the channel axis is obliquely oriented with respect to the spindle axis such that the wastegate channel and the valve element are configured to direct exhaust gas to the catalytic converter.

Having the channel axis is obliquely oriented with respect to the spindle axis allows the exhaust gas exiting the wastegate duct to be directed toward the catalytic converter, which ensures that the catalytic converter is adequately heated up, particularly in cold start of the internal combustion engine. Additionally, having the exhaust gas exiting the wastegate duct to be directed toward the catalytic converter reduces undesirable emissions from exiting the vehicle during warmup of the internal combustion engine and the catalytic converter.

Additionally, a system including the turbocharger is disclosed herein. The system also includes an internal combustion engine configured to produce exhaust gas, an exhaust system configured to deliver exhaust gas out of the vehicle, and a catalytic converter disposed between the internal combustion engine and the exhaust system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
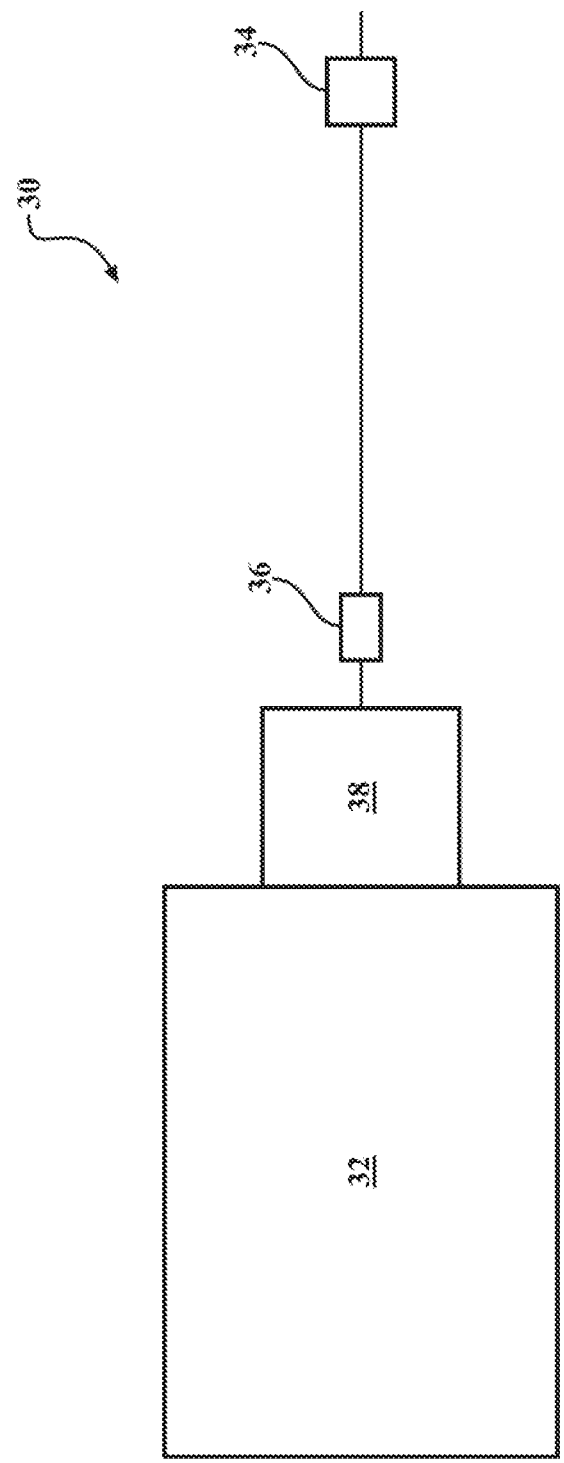
FIG. 1 is a schematic view of a vehicle including a turbocharger.

With reference to the Figures, wherein like numerals indicate like parts throughout the several views, a system 30 of a vehicle is schematically illustrated in FIG. 1. The system 30 includes an internal combustion engine 32, which produces exhaust gas during operation. The internal combustion engine 32 is in rotational communication with a vehicle transmission. The transmission may be any type of transmission including a hybrid, manual, automatic, or semi-automatic transmission as known by one of ordinary skill in the art. The internal combustion engine 32 generates rotational torque which is selectively translated to the transmission through a shaft which, in turn, translates rotational torque to one or more wheels. It should further be appreciated that the internal combustion engine 32 and/or transmission could be configured in any suitable way sufficient to generate and translate rotational torque so as to drive a vehicle, without departing from the scope of the present invention.

The system 30 also includes an exhaust system 34. The exhaust system 34 is configured to deliver exhaust gas out of the vehicle. Typically, the exhaust system 34 includes piping which is configured to guide the exhaust gas out of the vehicle. The exhaust system 34 may also include a muffler configured to reduce noise emitted by the exhaust gas exiting the exhaust system 34 and a tailpipe configured to direct the exhaust gas out of a rear or side of the vehicle. Other embodiments may include an exhaust pipe in addition to or in place of a tailpipe configured to direct the exhaust gas vertically out of the vehicle.

The system 30 also includes a catalytic converter 36 disposed between the internal combustion engine 32 and the exhaust system 34. The catalytic converter 36 is an exhaust emission control device configured to convert toxic gases and other pollutants in the exhaust gas into less-toxic forms by catalyzing a redox reaction. Typically, the catalytic converter 36 requires very high temperatures, e.g., 800 degrees Fahrenheit, to efficiently carry out the redox reactions. As such, heating the catalytic converter 36 after a cold start of the internal combustion engine 32 is required. In some embodiments, the catalytic converter 36 is disposed downstream of the internal combustion engine 32 and adjacent to the exhaust system 34 such that exhaust gases which exit the catalytic converter 36 flow directly to the exhaust system 34 where they can exit the vehicle. The catalytic converter 36 has a front face, which is defined as the face of the catalytic converter 36, and which is closest to the internal combustion engine 32 and includes an inlet into the catalytic converter 36. In other words, the front face is the face of the catalytic converter 36 which is exposed to the stream of exhaust gas prior to or while entering the catalytic converter 36.

Figure 2:
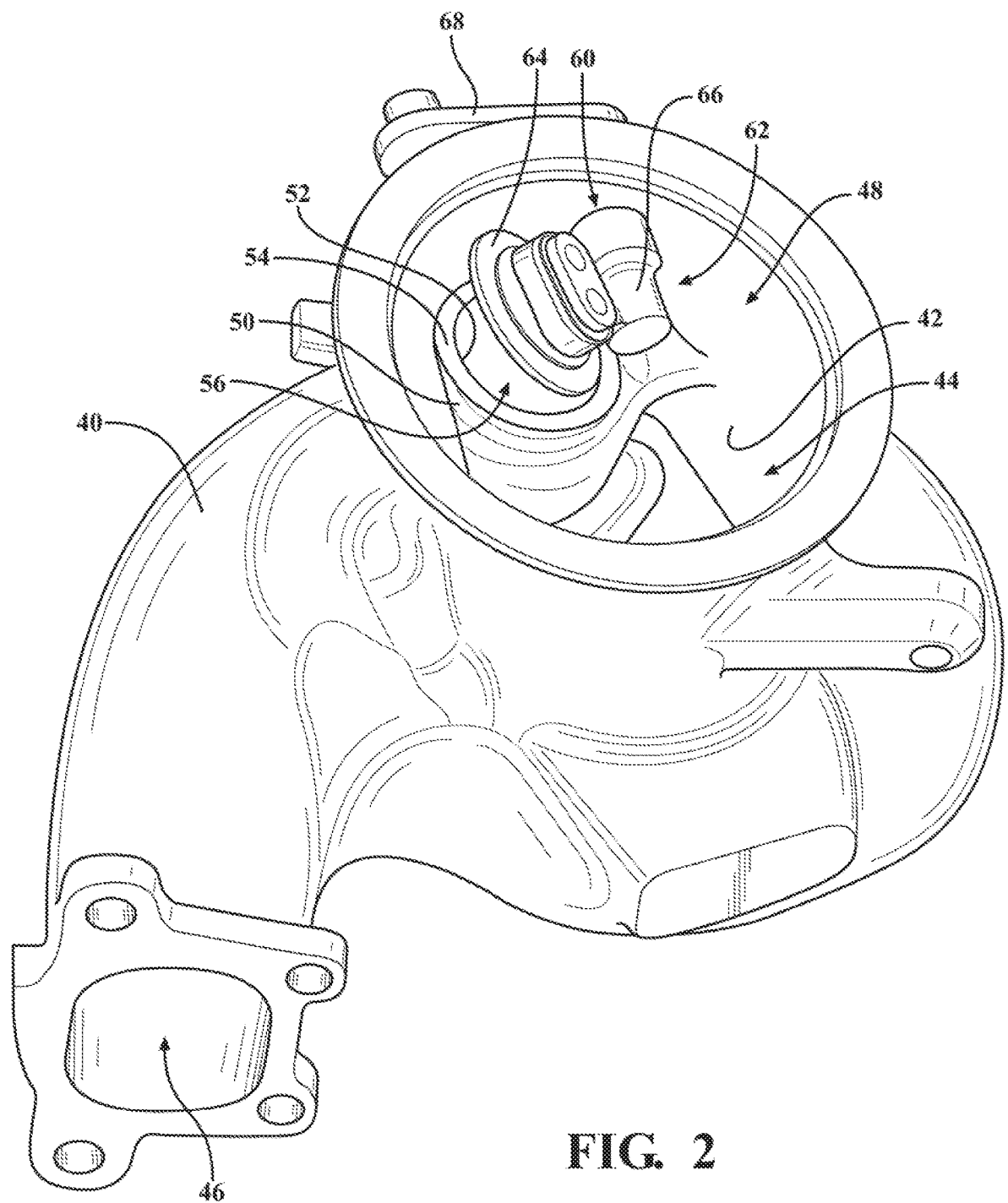
FIG. 2 is an isometric view of a valve seat, a wastegate assembly, and a turbine housing including a wastegate duct defining a wastegate channel.
Figure 3:
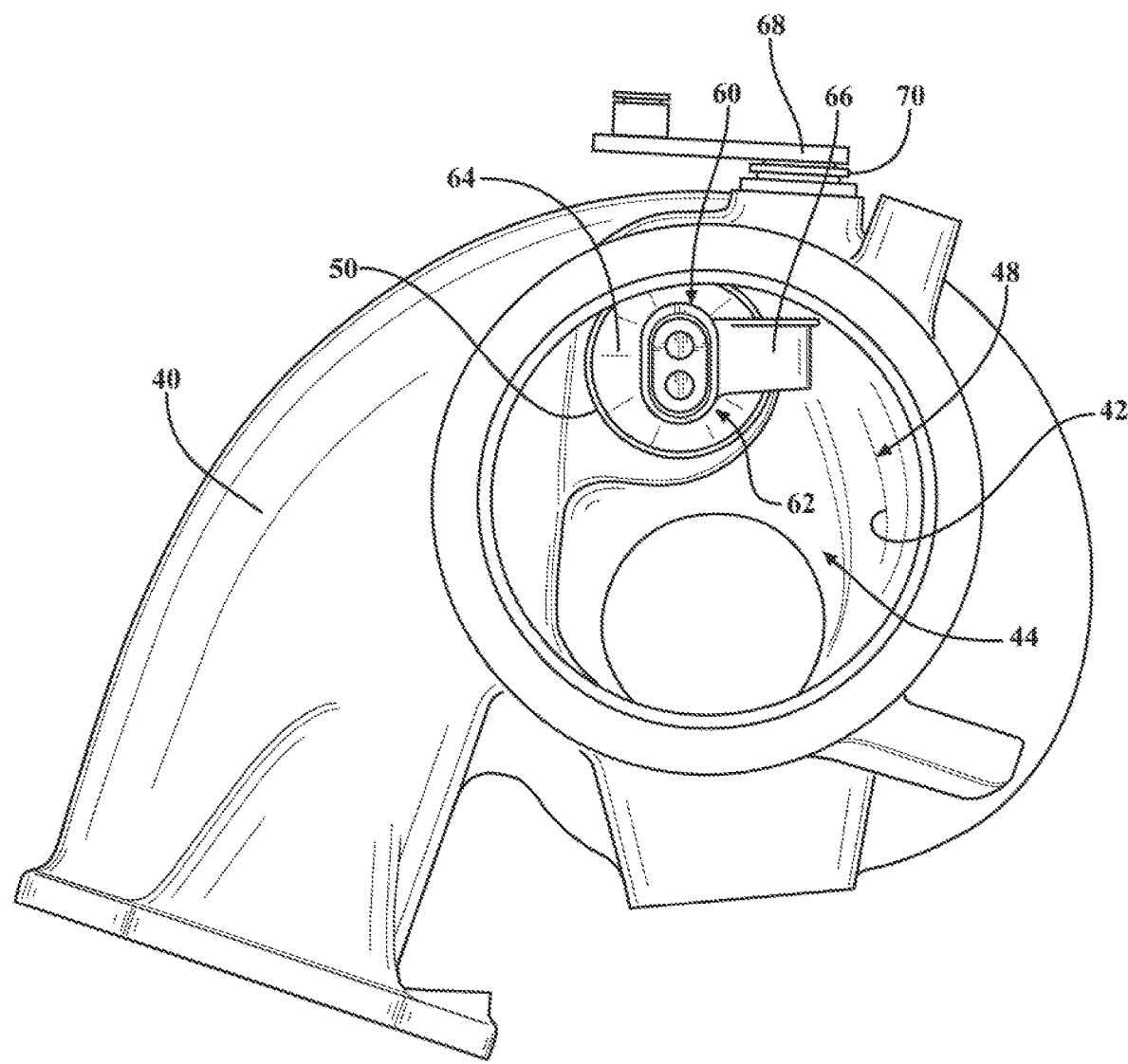
FIG. 3 is a top view of the turbine housing, the valve seat, and the wastegate assembly of FIG. 2.
Figure 4:
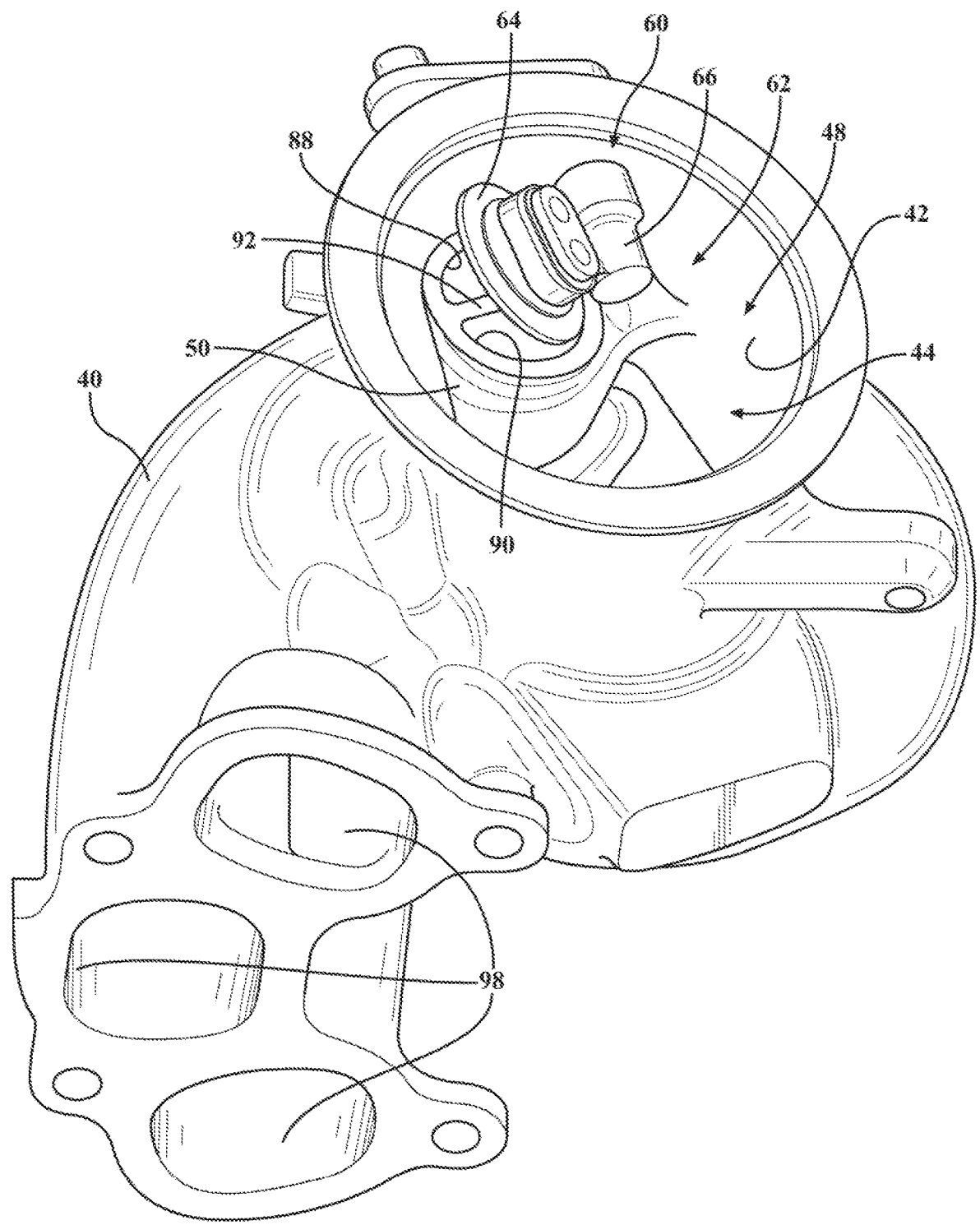
FIG. 4 is an isometric view of the wastegate channel being further defined as a first wastegate channel and a second wastegate channel.

Moreover, the system 30 includes a turbocharger 38 disposed between the internal combustion engine 32 and the catalytic converter 36. The turbocharger 38 may be used in automotive vehicle applications, heavy equipment, diesel engines, motors, and the like. The turbocharger 38 receives exhaust gas from the internal combustion engine 32 and directs exhaust gas to the exhaust system 34. With reference to FIGS. 2-4, the turbocharger 38 includes a turbine housing 40. The turbine housing 40 includes an interior surface 42 defining a turbine housing interior 44. The interior surface 42 extends between a turbine housing inlet 46 defined at one end of the interior surface 42 and in fluid communication with the internal combustion engine 32 and the turbine housing interior 44 for delivering exhaust gas from the internal combustion engine 32 to the turbine housing interior 44, and a turbine housing outlet 48 defined at an opposite end of the interior surface 42 and in fluid communication with the turbine housing interior 44 for discharging exhaust gas from the turbine housing interior 44. The turbine housing 40 also includes a wastegate duct 50 disposed downstream of the turbine housing inlet and defining a wastegate channel 52 in fluid communication with the turbine housing inlet 46 for discharging exhaust gas from the turbine housing inlet 46 by bypassing the turbine housing interior 44. The turbocharger 38 also includes a valve seat 54 disposed about the wastegate channel 52 at a wastegate channel outlet 56 of the wastegate channel 52. The valve seat 54 is commonly referred to as a port face. With particular reference to FIG. 5B, the valve seat 54 has a valve seat plane VSP extending along the valve seat 54. It is contemplated that the exhaust gas which flows through the wastegate duct 50 may completely bypass the turbine housing interior 44 such that the exhaust gas flows directly from the turbine housing inlet 46 to the turbine housing outlet 48, or it is contemplated that a portion of the exhaust gas may flow in the turbine housing interior 44 either prior to entering the wastegate duct 50 from the turbine housing inlet 46 or after exiting the wastegate duct 50 before flowing to the turbine housing outlet 48.

With continued reference to FIG. 5B, the wastegate channel 52 typically includes a wastegate channel inlet 58 and a wastegate channel outlet 56. When present, the wastegate channel inlet 58 is in fluid communication with the turbine housing inlet 46 and the wastegate channel outlet 56 is in fluid communication with the turbine housing outlet 48. However, it is to be appreciated that the wastegate channel outlet 56 may be in fluid communication with an environment outside of the turbine housing 40 instead of the turbine housing outlet 48. In other words, exhaust gas may flow through the wastegate channel outlet 56 and be discharged to the environment outside of the turbine housing 40 without first flowing through the turbine housing outlet 48.

The turbocharger 38 additionally includes a wastegate assembly 60 for controlling exhaust gas flow to, for example, the turbine housing interior 44. The wastegate assembly 60 includes a valve element 62 engageable with the valve seat 54. The valve element 62 has a valve body 64 and a wastegate arm 66 extending away from the valve body 64. The valve element 62 is moveable between a first position, as shown in FIG. 2, and a second position, as shown in FIG. 3. In the first position, the valve body 64 is engaged with the valve seat 54 for preventing exhaust gas flow from the turbine housing inlet 46 to bypass the turbine housing interior 44. In the second position, the valve body 64 is disengaged with the valve seat 54 for allowing exhaust gas flow from the turbine housing inlet 46 to bypass the turbine housing interior 44. The valve body 64 may be partially disengaged from the valve seat 54 in the second position such that a portion of the valve body 64 is engaged with the valve seat 54, or the valve body 64 may be completely disengaged from the valve seat 54, as desired to control flow from the wastegate channel 52. The valve body 64 may move from the first position to the second position in a swinging motion and at an angle such that an upper portion of the valve body 64 is disposed closer to the valve seat 54 than a lower portion of the valve body 64 when the valve body 64 is in the second position. However, it is also contemplated that the valve body 64 may move from the first position to the second position in any way as desired. The valve body 64 may be any suitable shape, such as circular, oval, square, or triangular. The valve element 62 may be a swing valve, a piston and ball valve, a butterfly valve, and a stop and tilting disk valve.

The wastegate assembly 60 may include a spindle 68 coupled to the wastegate arm 66 of the valve element 62 for moving the valve element 62 between the first and second positions. When present, the spindle 68 extends along a spindle axis SA. With reference to FIGS. 5A-D, the valve seat plane VSP may be obliquely oriented with respect to the spindle axis SA such that the wastegate channel 52 and the valve element 62 are configured to direct exhaust gas to the catalytic converter 36. Having the valve seat plane VSP being obliquely oriented with respect to the spindle axis SA allows the exhaust gas exiting the wastegate duct 50 to be directed toward the catalytic converter 36, which ensures that the catalytic converter 36 is adequately heated up, particularly in cold start of the internal combustion engine 32. Additionally, having the exhaust gas exiting the wastegate duct 50 to be directed toward the catalytic converter 36 reduces undesirable emissions from exiting the vehicle during warmup of the internal combustion engine 32 and the catalytic converter 36. Furthermore, having the valve seat plane VSP being obliquely oriented with respect to the spindle axis SA can reduce manufacturing constraints of a bushing 70 of the wastegate assembly 60, and the geometry of the valve body 64 and valve seat 54. Reducing manufacturing constraints allows the wastegate assembly 60 to be placed in various locations independent of the design of the turbine housing 40, as the wastegate assembly 60 is to optimize flow of the exhaust gas to advantageously direct exhaust gas toward the catalytic converter 36, which can be adjusted based on the location of the wastegate assembly by having the valve seat plane VSP being obliquely oriented with respect to the spindle axis SA. Specifically, having the valve seat plane VSP being obliquely oriented with respect to the spindle axis SA allows more freedom to target a center of the catalyst by reducing the impact of manufacturing constraints. Additionally, having the valve seat plane VSP being obliquely oriented with respect to the spindle axis SA can change an impingement angle of the exhaust flow onto the valve body 64, which has a strong effect on the flow of exhaust gas into the catalyst. Furthermore, having the valve seat plane VSP being obliquely oriented with respect to the spindle axis SA allows redirection of the wastegate channel 52 and, by doing so, the wastegate channel 52 may be reoriented without moving the spindle axis SA and, consequently, the bushing 70.

The catalytic converter 36 may at least partially disposed in the turbine housing 40. In another embodiment, the catalytic converter 36 may be disposed adjacent to the turbine housing outlet 48. However, it is also contemplated that the catalytic converter 36 may be disposed anywhere between the internal combustion engine 32 and the exhaust system 34.

Figure 7:
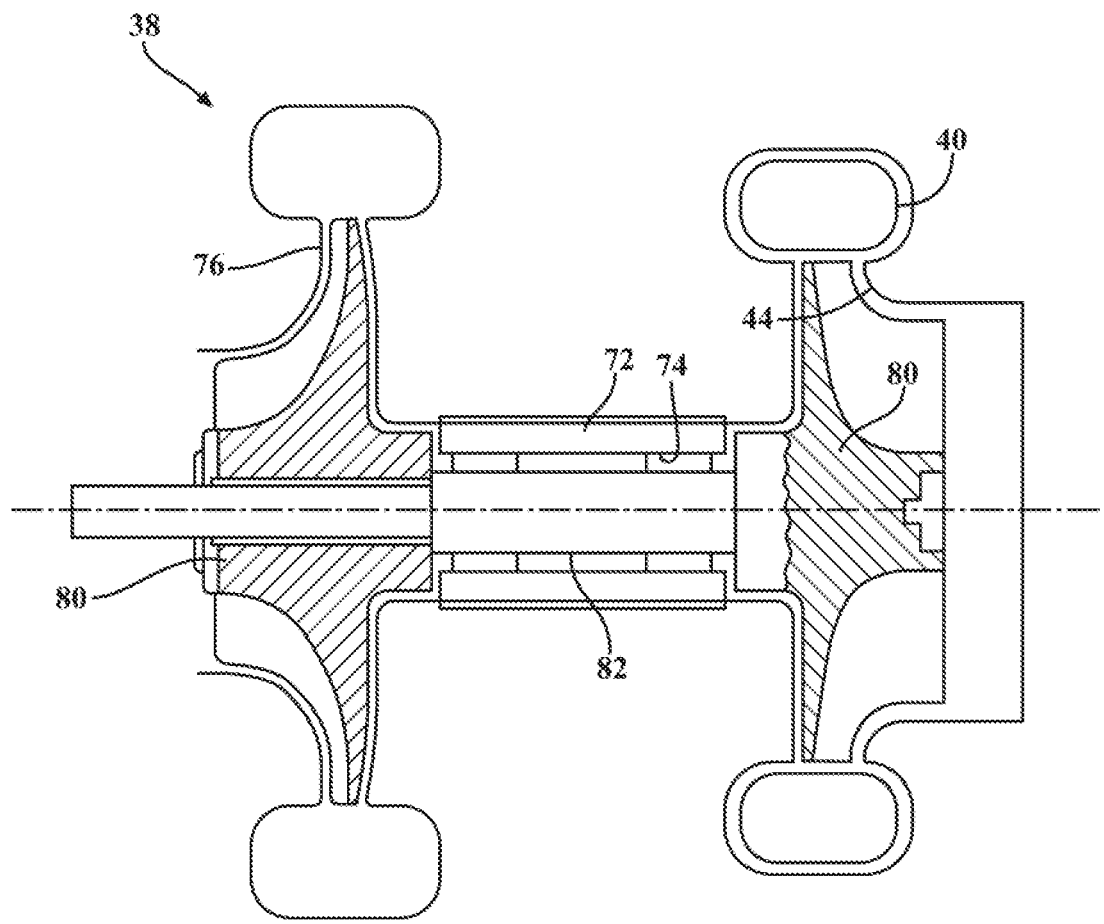
FIG. 7 is a schematic illustration of the turbocharger including a bearing housing coupled to the turbine housing and defining a bearing housing interior, a compressor housing coupled to the bearing housing and defining a compressor housing interior, a turbine wheel disposed in the turbine interior, a shaft rotatably coupled to the turbine wheel and disposed in the bearing housing interior, and a compressor wheel rotatably coupled to the shaft.

As shown in FIG. 7, the turbocharger 38 may include a bearing housing 72 coupled to the turbine housing 40 and defining a bearing housing interior 74. The turbocharger 38 may include a compressor housing 76 coupled to the bearing housing 72 and defining a compressor housing interior 78. The turbocharger 38 may include a turbine wheel 80 disposed in the turbine housing interior 44. The turbocharger 38 may include a shaft 82 rotatably coupled to the turbine wheel 80 and disposed in the bearing housing interior 74. The turbocharger 38 may include a compressor wheel 84 rotatably coupled to the shaft 82. It is to be appreciated that, when the turbine wheel 80 is included in the turbocharger 38, the turbine wheel 80 may be disposed completely inside the turbine housing interior 44 or partially inside the turbine housing interior 44. The turbine wheel 80 receives exhaust gas from the internal combustion engine via the turbine housing inlet 46, causing the turbine wheel 80 to rotate. After rotating the turbine wheel 80, exhaust gas is discharged from the turbine housing interior 44 through the turbine housing outlet 48.

Figure 5A:
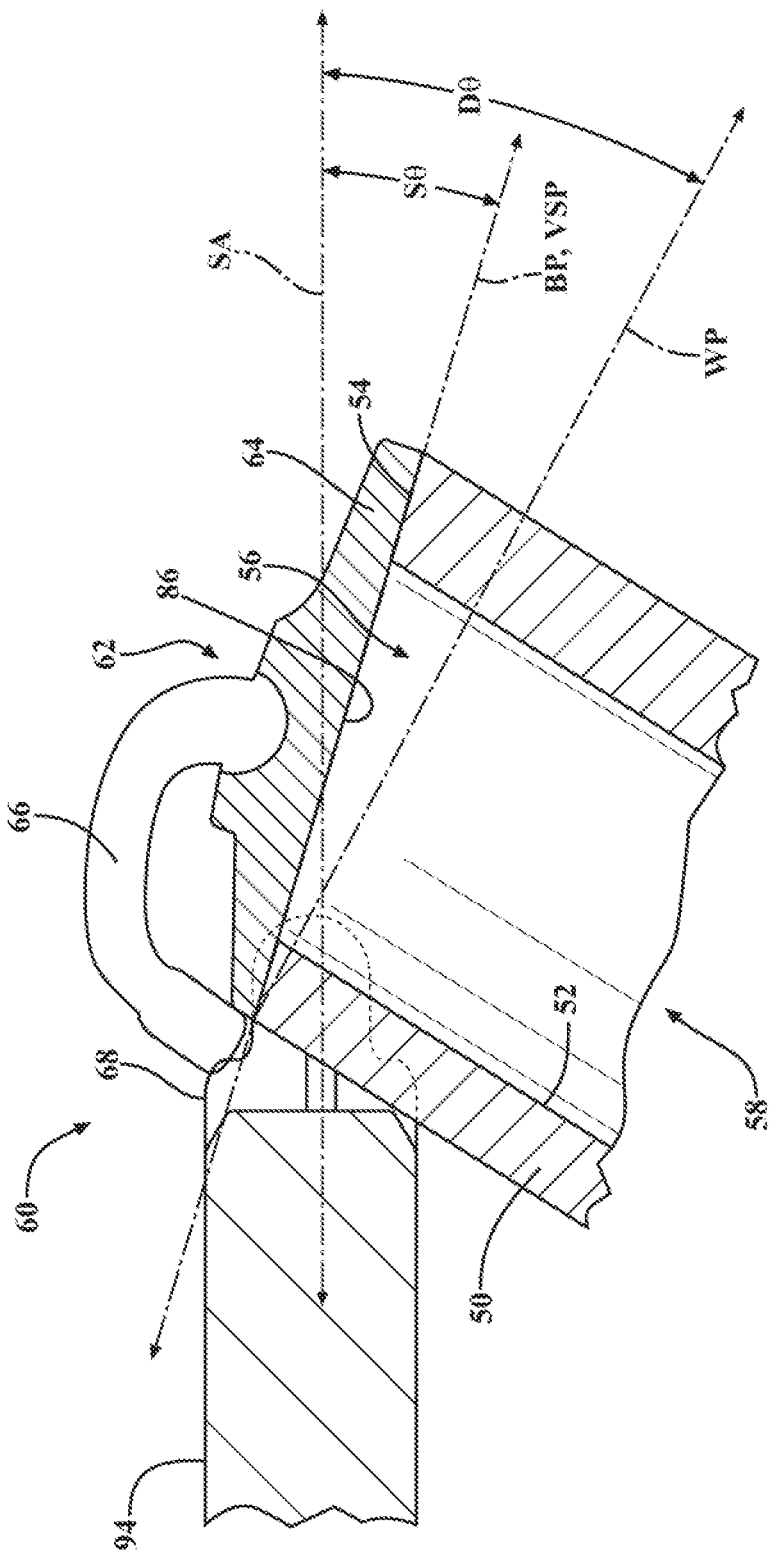
FIG. 5A is a cross-sectional view of the wastegate assembly and the wastegate duct defining a wastegate channel, with a valve seat disposed about the wastegate channel, with the wastegate assembly including a spindle extending along a spindle axis and a valve element including a valve body and a wastegate arm, with the valve element being in a first position for preventing exhaust gas flow, with the valve seat having a valve seat plane extending along the valve seat, and with the valve seat plane being obliquely oriented with respect to the spindle axis.
Figure 5B:
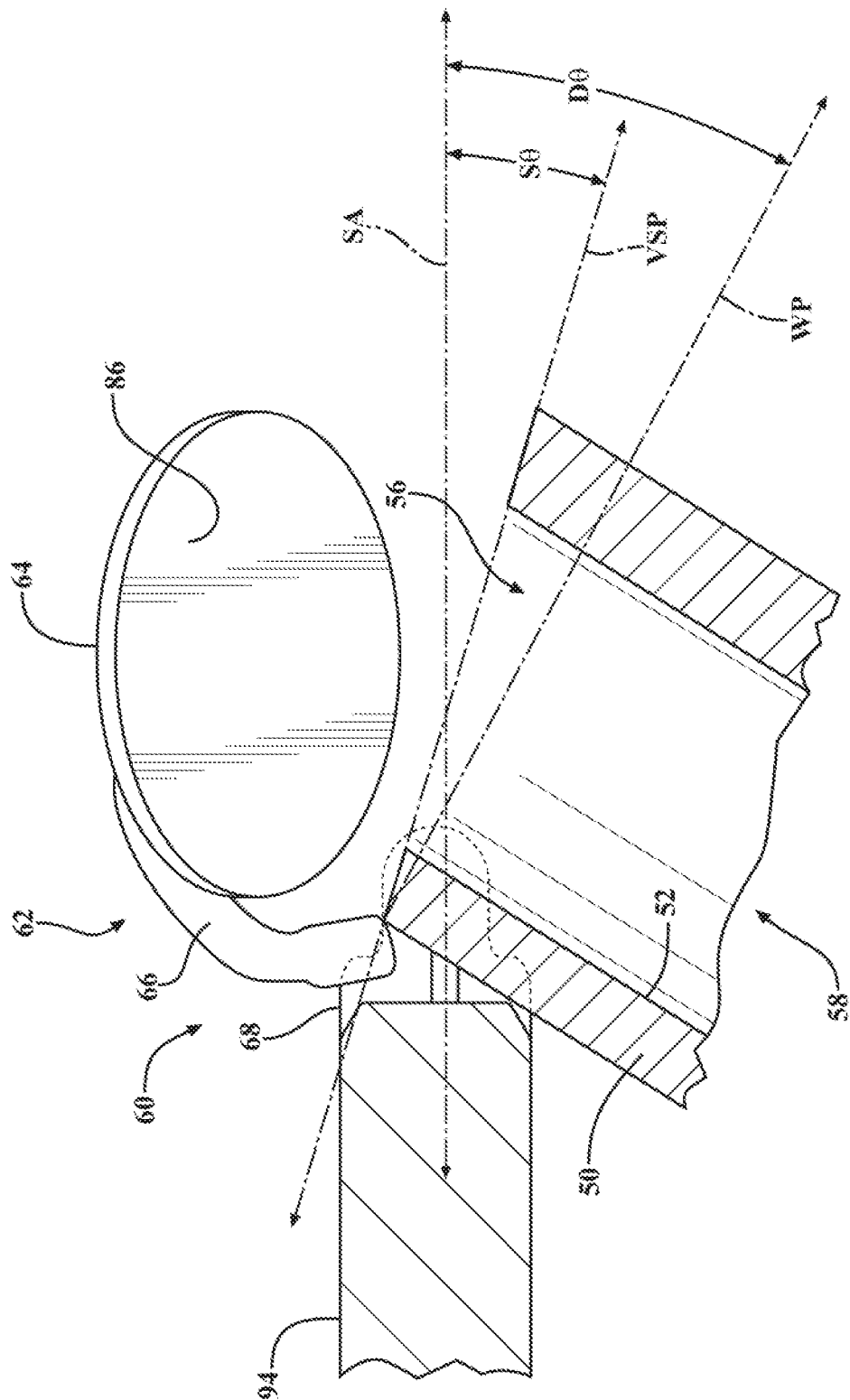
FIG. 5B is a cross-sectional view of the wastegate assembly and wastegate duct of FIG. 5A, with the valve element being in a second position for allowing flow of exhaust gas through the wastegate channel.

As shown in FIG. 5A, the valve seat plane VSP and the spindle axis SA may define a spindle angle S$\Theta$ when the valve element 62 is in the first position such that the valve body 64 is engaged with the valve seat 54. The spindle angle S$\Theta$ may be any suitable angle such that the spindle axis SA is obliquely oriented to the valve seat plane VSP to direct the exhaust gas as desired. In a non-limiting example, the spindle angle S$\Theta$ may be between 1 and 80 degrees. In another non-limiting example, the spindle angle S$\Theta$ may be 10 degrees. In another non-limiting example, the spindle angle S$\Theta$ may be 20 degrees. In another non-limiting example, the spindle angle S$\Theta$ may be 30 degrees. In another non-limiting example, the spindle angle S$\Theta$ may be 40 degrees. In another non-limiting example, the spindle angle S$\Theta$ may be 50 degrees. In another non-limiting example, the spindle angle SΘ may be 60 degrees. In another non-limiting example, the spindle angle SΘ may be 70 degrees. The wastegate channel 52 may have a wastegate plane WP extending normal with respect to the flow of exhaust gas. The spindle axis SA and the wastegate plane WP define a duct angle DΘ. The duct angle DΘ is greater than the spindle angle SΘ.

Figure 5C:
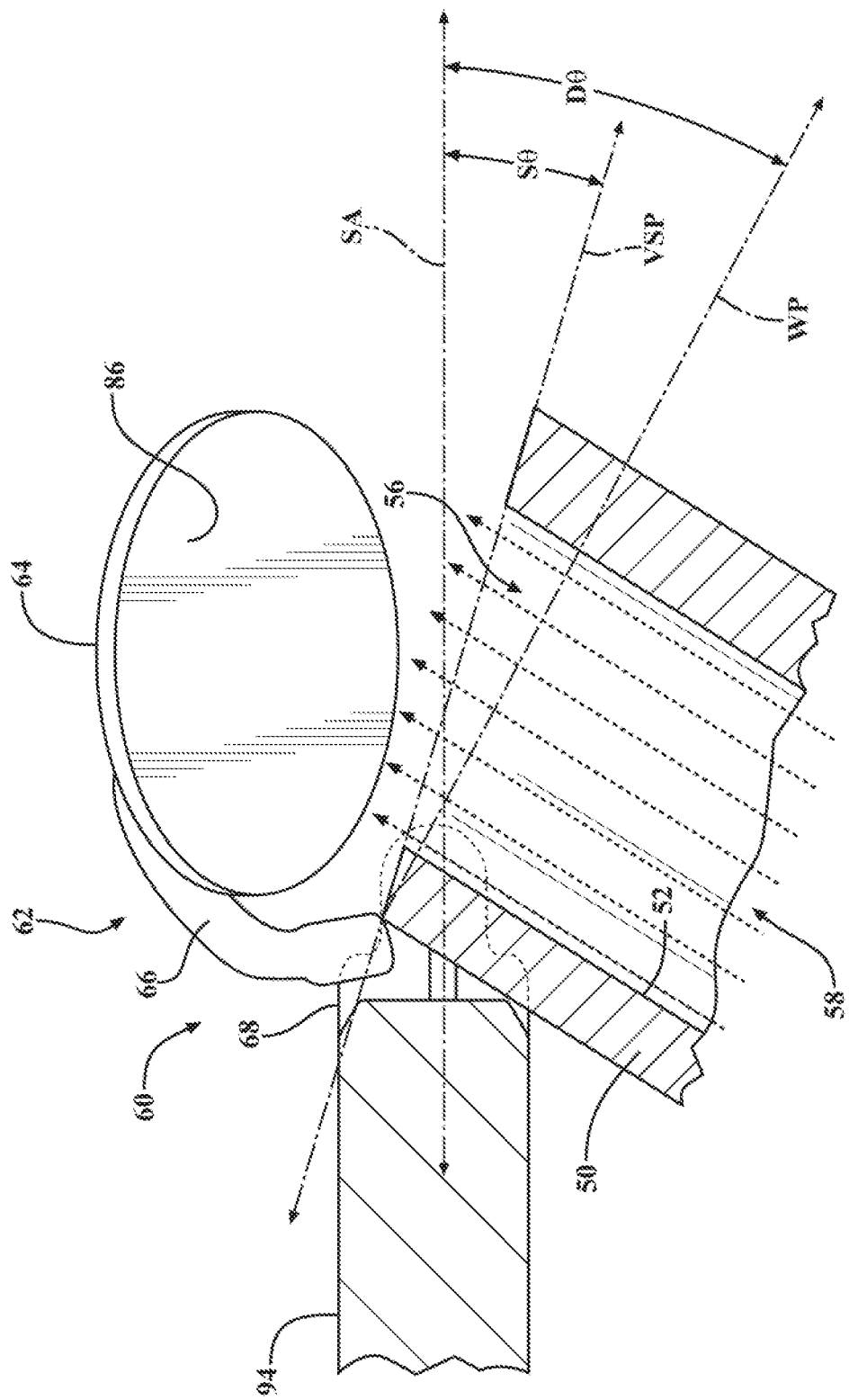
FIG. 5C is a cross-sectional view of a flow contour diagram of the wastegate assembly and wastegate duct of FIG. 5B.

The valve body 64 may have a body surface 86 facing the valve seat 54 and engageable with the valve seat 54. The body surface 86 of the valve body 64 is commonly referred to as a valve face. In such embodiments, as shown in FIG. 5B, the body surface 86 has a body plane BP extending along the body surface 86, and the body plane BP is parallel with the valve seat plane VSP when the valve element 62 is in the first position. FIG. 5C illustrates a flow contour diagram of the exhaust gas when the valve element is in the second position. As shown in FIG. 5C, the exhaust gas is directed obliquely with respect to the spindle axis SA such that the wastegate channel 52 and the valve element 62 are configured to direct exhaust gas to, for example, the catalytic converter 36. The flow of exhaust gas is illustrated by arrows 87.

Figure 5D:
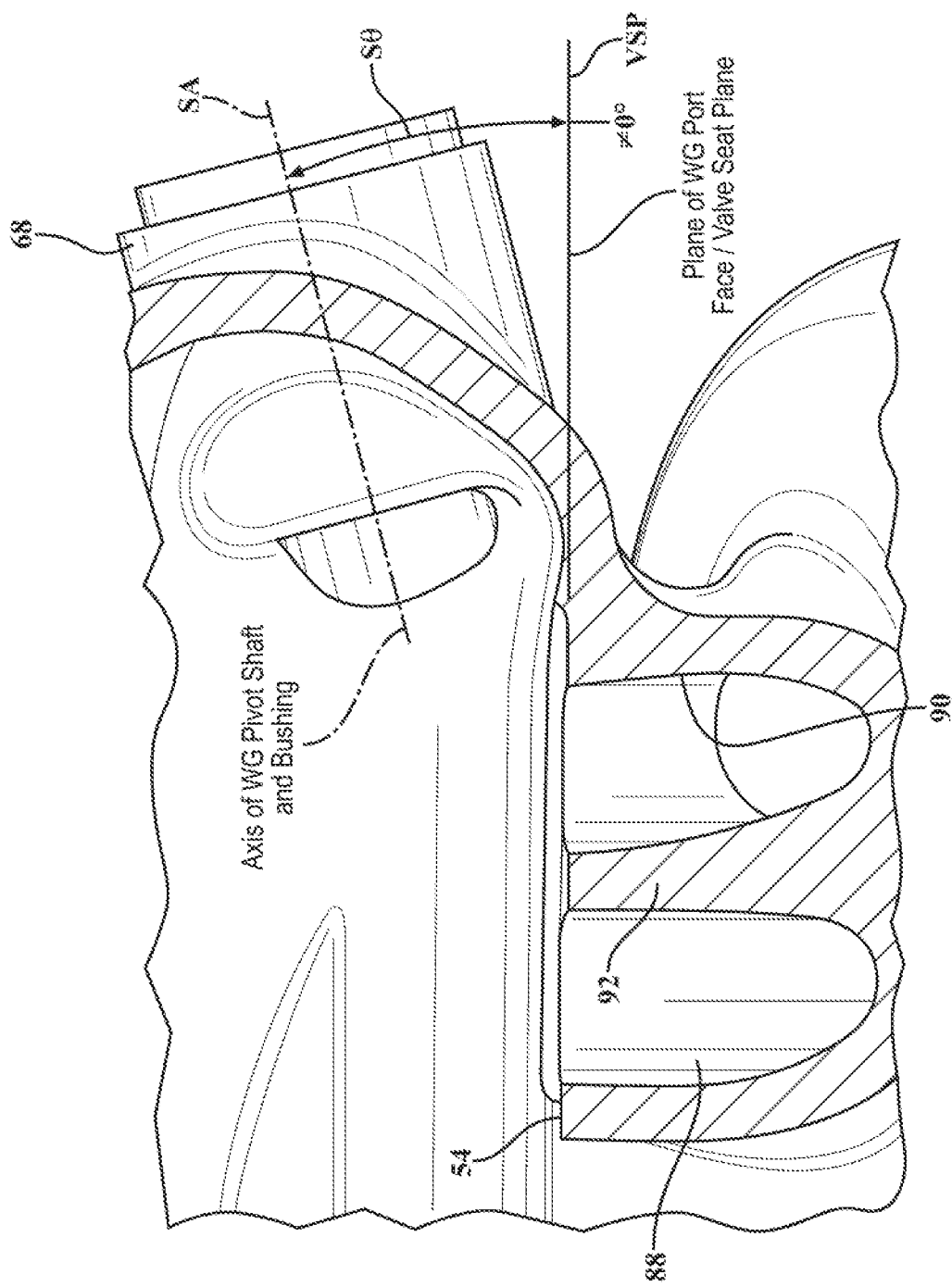
FIG. 5D is side cross-sectional view of the wastegate duct, with the wastegate duct defining the first wastegate channel and the second wastegate channel, and with the valve seat plane being obliquely oriented with respect to the spindle axis.

FIG. 5D illustrates a side cross-sectional view of the wastegate duct 50, with the wastegate duct 50 defining a first wastegate channel 88 and a second wastegate channel 90, and with the valve seat plane VSP being obliquely oriented with respect to the spindle axis SA. When the wastegate duct 50 defines the first and second wastegate channels 88, 90, the turbocharger 38 may be referred to as a twin-scroll turbocharger. When only the wastegate channel 52 is present, such as shown in FIG. 5A-5C, the turbocharger 38 may be referred to as a mono-scroll turbocharger. The valve seat plane VSP and the spindle axis SA define the spindle angle SΘ. The first and second wastegate channels 88, 90 are in fluid communication with the turbine housing inlet 46 for discharging exhaust gas from the turbine housing inlet 46 by bypassing the turbine housing interior 44. In such embodiments, the valve seat 54 is disposed about the first and second wastegate channels 88, 90 at respective channel outlets of the first and second wastegate channels 88, 90. When the wastegate channel 52 is further defined as the first and second wastegate channels 88, 90, the valve seat 54 includes a dividing portion 92 such that the valve seat 54 is configured for a twin scroll turbocharger application. The dividing portion 92 is commonly referred to as a dividing wall. The valve seat 54 may be comprised of a metal such as steel or steel alloy, as desired by one of ordinary skill in the art. It is to be appreciated that exhaust gas which flows through the first and second wastegate channels 88, 90 may completely bypass the turbine housing interior 44 such that exhaust gas flows directly from the turbine housing inlet 46 to the turbine housing outlet 48 via the first and second wastegate channels 88, 90. Alternatively, exhaust gas may flow in the turbine housing interior 44 either prior to entering the first and second wastegate channels 88, 90 from the turbine housing inlet 46 or after exiting the first and second wastegate channels 88, 90.

Figure 5E:
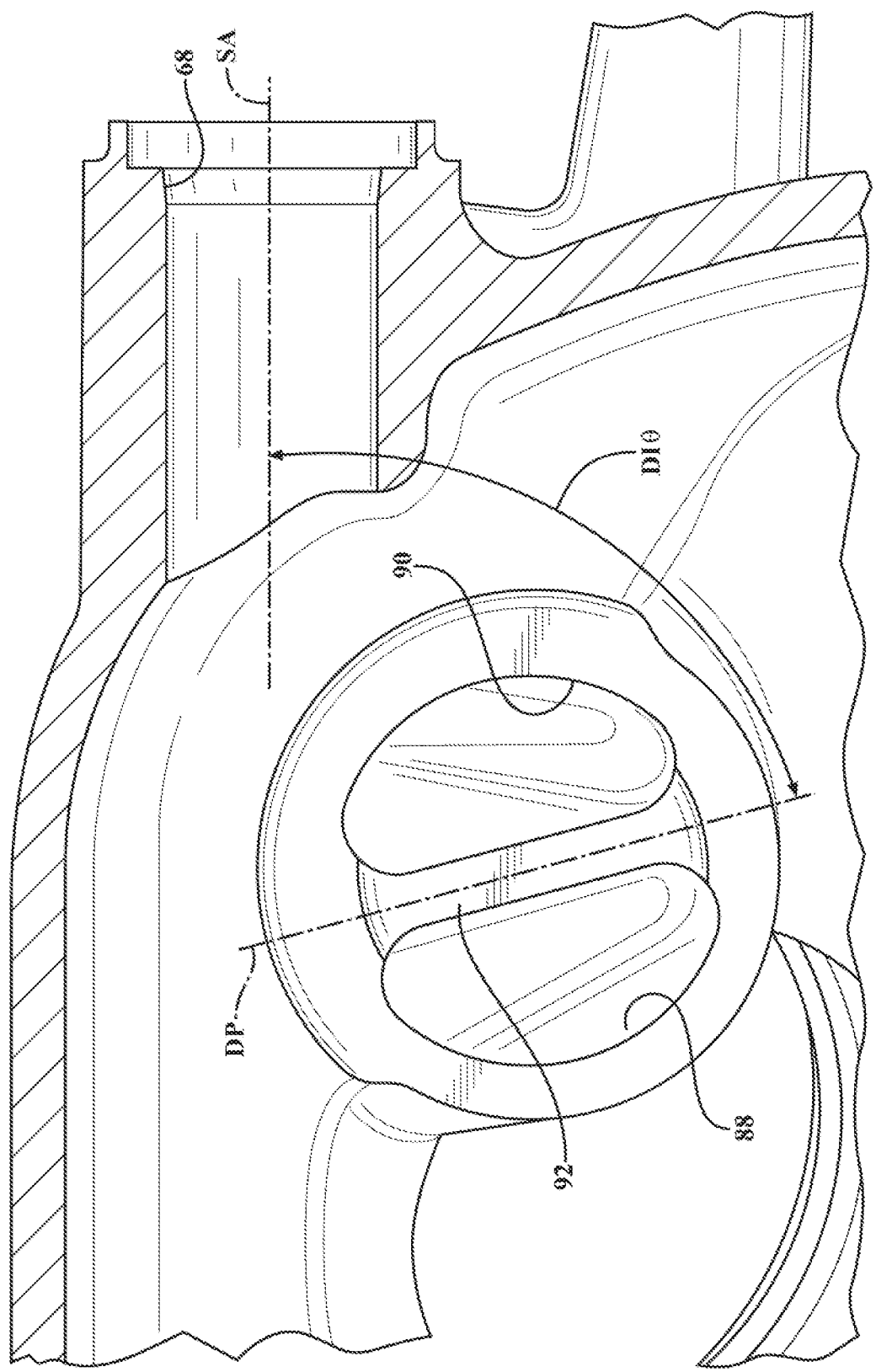
FIG. 5E is a top cross-sectional view of the wastegate duct, with the wastegate duct defining the first wastegate channel and the second wastegate channel and divided by a dividing portion, and with the dividing portion extending along a dividing plane that is obliquely oriented with respect to the spindle axis.

FIG. 5E is a top cross-sectional view of the wastegate duct 50, with the wastegate duct 50 defining the first wastegate channel 88 and the second wastegate channel 90 and divided by the dividing portion 92. In such embodiments, the dividing portion 92 may extend along a dividing plane DP that is obliquely oriented with respect to the spindle axis SA. Having the dividing plane DP being obliquely oriented with respect to the spindle axis SA allows the wastegate duct 50 to direct the exhaust gas in the desired direction from the wastegate channel 52, which allows the exhaust gas to specifically target the catalytic converter, which, ultimately, improves vehicle emissions. Additionally, manufacturing constraints are reduced, which allows the wastegate assembly 60 to be placed in various locations independent of the design of the turbine housing 40, as the wastegate assembly 60 is to optimize flow of the exhaust gas to advantageously direct exhaust gas toward the catalytic converter 36, which can be adjusted based on the location of the wastegate assembly 60 by having the dividing plane DP being obliquely oriented with respect to the spindle axis SA. Specifically, having the dividing plane DP being obliquely oriented with respect to the spindle axis SA allows more freedom to target a center of the catalyst by reducing the impact of manufacturing constraints. Furthermore, having the dividing plane DP being obliquely oriented with respect to the spindle axis SA allows redirection of the wastegate channel 52 and, by doing so, the wastegate channel 52 may be reoriented without moving the spindle axis SA and, consequently, the bushing 70.

The dividing plane DP and the spindle axis SA define a dividing angle DIΘ. The dividing angle DIΘ may be any suitable angle that is not normal, i.e., 90 degrees. By non-limiting example, the dividing angle DIΘ may be between 10 and 80 degrees. In another non-limiting example, the dividing angle dividing angle DIΘ may be 20 degrees. In another non-limiting example, the dividing angle dividing angle DIΘ may be 30 degrees. In another non-limiting example, the dividing angle dividing angle DIΘ may be 40 degrees. In another non-limiting example, the dividing angle dividing angle DIΘ may be 50 degrees. In another non-limiting example, the dividing angle dividing angle DIΘ may be 60 degrees. In another non-limiting example, the dividing angle dividing angle DIΘ may be 70 degrees. In another non-limiting example, the dividing angle DIΘ may be between 91 and 170 degrees. In another non-limiting example, the dividing angle dividing angle DIΘ may be 100 degrees. In another non-limiting example, the dividing angle dividing angle DIΘ may be 110 degrees. In another non-limiting example, the dividing angle dividing angle DIΘ may be 120 degrees. In another non-limiting example, the dividing angle dividing angle DIΘ may be 130 degrees. In another non-limiting example, the dividing angle dividing angle DIΘ may be 140 degrees. In another non-limiting example, the dividing angle dividing angle DIΘ may be 150 degrees. In another non-limiting example, the dividing angle dividing angle DIΘ may be 160 degrees. It is to be appreciated that when only one wastegate channel is present, the channel axis CA may be obliquely oriented with respect to the spindle axis SA.

As shown in FIGS. 5A-5E, an actuator 94 may be coupled to the spindle 68 for moving the spindle 68 to move the valve element 62 between the first and second positions. The actuator 94 may be an electronic actuator or a pneumatic actuator. It is to be appreciated that other mechanisms, such as a spring or a piston, may move the valve element 62 between the first and second positions.

As shown in FIG. 4, the turbine housing inlet 46 may further be defined as a first volute inlet 96 and a second volute inlet 98 for delivering exhaust gas from the internal combustion engine to the turbine housing interior 44. When the first and second volute inlets 96, 98 are present, the first volute inlet 96 is in fluid communication with the first wastegate channel 88 and the second volute inlet 98 is in fluid communication with the second wastegate channel 90. Although not required, the second volute inlet 98 may be bifurcated as shown in FIG. 4. It is to be appreciated that the first volute inlet 96 may be bifurcated, or that neither of the first and second volute inlets 96, 98 may be bifurcated.

During operation of the internal combustion engine 32, exhaust gas flows from the internal combustion engine 32 to the turbine housing inlet 46. The activation may occur by a manual method such as a user turning a key to activate the internal combustion engine 32, or may occur by an electronic method such as an electronic actuator activating the internal combustion engine 32. The valve element 62 begins in the first position where the valve body 64 is engaged with the valve seat 54 for preventing flow of the exhaust gas through the wastegate channel 52. When desired, the valve element 62 is moved from the first position to the second position where the valve body 64 is disengaged with the valve seat 54 for allowing flow of exhaust gas through the wastegate channel 52. As described above, the movement of the valve element 62 from the first position to the second position may be actuated by the wastegate arm 66 which is configured to rotate allowing the valve element 62 to move to the second position such that the valve body 64 is disengaged from the valve seat 54. The exhaust gas flows through the wastegate channel 52. As described above, having the valve seat plane VSP being obliquely oriented with respect to the spindle axis SA as shown in FIGS. 5A-5D, and/or having the dividing plane being obliquely oriented with respect to the spindle axis SA as shown in FIG. 5E, allows the exhaust gas exiting the wastegate duct 50 to be directed toward the center of the catalytic converter 36, which facilitates rapid heating of the catalytic converter 36, particularly in cold start of the internal combustion engine 32. The valve seat plane VSP being obliquely oriented with respect to the spindle axis SA allows the exhaust gas exiting the wastegate duct 50 to advantageously hit the valve body 64, which directs the exhaust gas toward the front face of the catalytic converter 36, which results in heating up the catalytic converter quickly to avoid unwanted pollutants. Additionally, having the exhaust gas exiting the wastegate duct 50 to be directed toward the catalytic converter 36 reduces undesirable emissions from exiting the vehicle during warmup of the internal combustion engine 32 and the catalytic converter 36.

Figure 6:
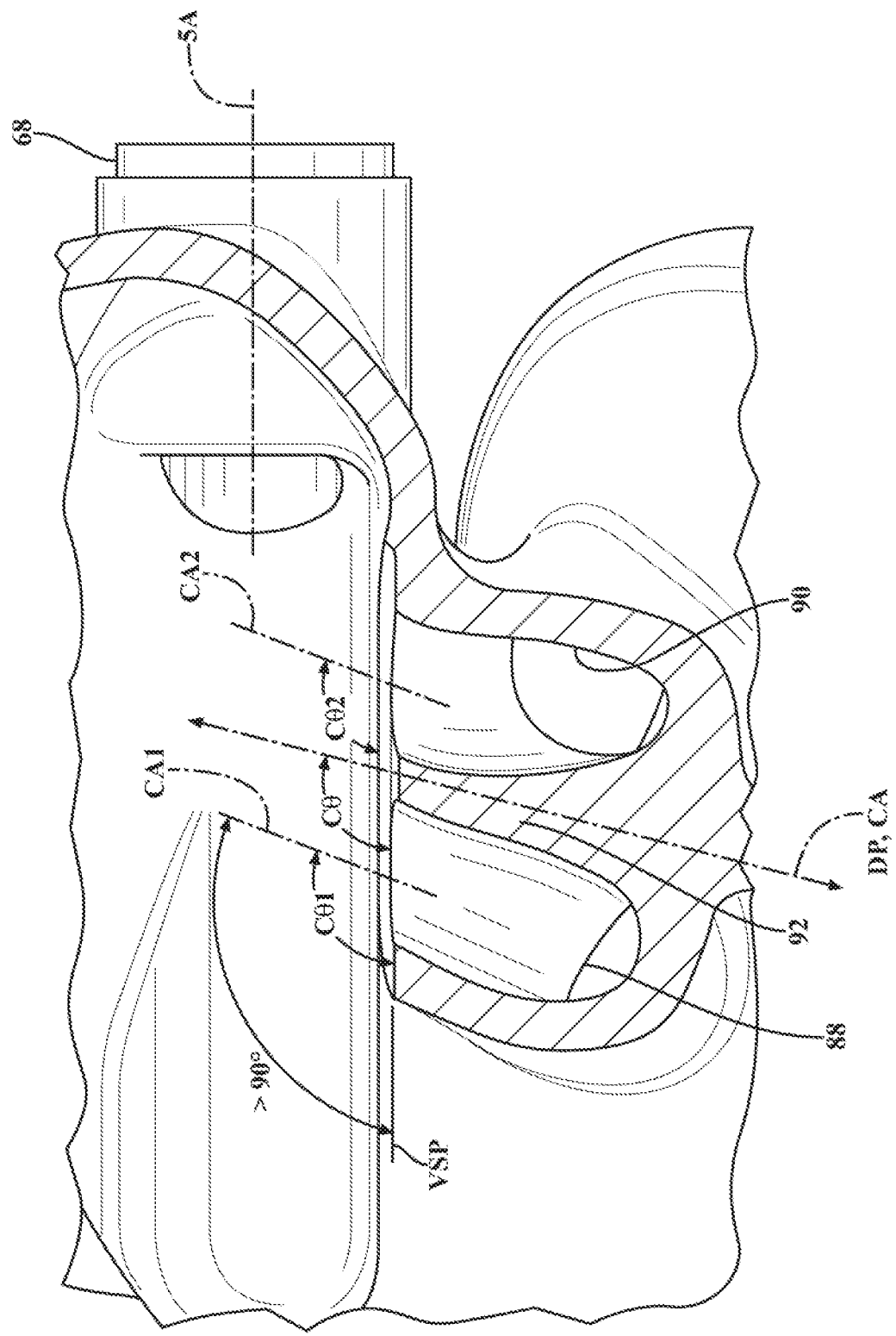
FIG. 6 is a side cross-sectional view of the wastegate duct and the wastegate assembly, with the wastegate duct defining the first wastegate channel and the second wastegate channel and divided by a dividing portion, and with the dividing portion, the first wastegate channel, and the second wastegate channel being obliquely oriented with respect to the spindle axis.

As shown in FIG. 6, the wastegate channel 52 extends along a channel axis CA, and the channel axis CA is obliquely oriented with respect to the valve seat plane VSP such that the wastegate channel 52 and the valve element 62 are configured to direct exhaust gas to the catalytic converter 36. In other words, the wastegate channel 52 is obliquely oriented with respect to the valve seat plane VSP. In conventional turbochargers, the exhaust flow is normal to the valve seat plane VSP, which results in an efficient direction of the flow of exhaust gas and also gives equal forces across the valve body 64 from the exhaust gas. In the turbocharger 38 and wastegate assembly 60 shown in FIG. 6, the flow of exhaust gas flows obliquely with respect to the valve seat plane VSP, which results in the exhaust gas being targeted to a specific area of the exhaust system 34, for example the catalytic converter 36. The channel axis CA being obliquely oriented with respect to the valve seat plane VSP results in the exhaust gas being targeted to a specific area of the exhaust system 34. Additionally, having the channel axis CA being obliquely oriented with respect to the valve seat plane VSP allows more freedom to target a center of the catalyst by reducing the impact of manufacturing constraints. In other words, the flow of exhaust gas through the wastegate channel is able to be skewed without having to reposition the entire wastegate assembly 60 and wastegate duct 50, which results in reducing cost of the wastegate assembly 60 and increasing efficiency in vehicle emissions. Furthermore, having the channel axis CA being obliquely oriented with respect to the valve seat plane VSP allows more freedom to target a center of the catalyst by reducing the impact of manufacturing constraints. Furthermore, having the channel axis CA being obliquely oriented with respect to the valve seat plane VSP allows redirection of the wastegate channel 52 and, by doing so, the wastegate channel 52 may be reoriented without moving the spindle axis SA and, consequently, the bushing 70. The channel axis CA and the valve seat plane define a channel angle CΘ. The channel angle CΘ may be any suitable angle that is not normal, i.e., 90 degrees with respect to the spindle axis SA. By non-limiting example, the channel angle CΘ may be between 100 and 170 degrees. By another non-limiting example, the channel angle CΘ may be 110 degrees. By another non-limiting example, the channel angle CΘ may be 120 degrees. By another non-limiting example, the channel angle CΘ may be 130 degrees. By another non-limiting example, the channel angle CΘ may be 140 degrees. By another non-limiting example, the channel angle CΘ may be 150 degrees. By another non-limiting example, the channel angle CΘ may be 160 degrees.

As specifically shown in FIG. 6, a side cross-sectional view of the wastegate duct 50 and the wastegate assembly 60, with the wastegate duct 50 defining the first wastegate channel 88 and the second wastegate channel 90, and with the channel axis CA1 of the first wastegate channel 88 and the channel axis CA2 of the second wastegate channel 90 being obliquely oriented with said valve seat plane VSP. Specifically, the channel axis CA may be further defined as a first channel axis CA1 extending along the first wastegate channel 88, with the second wastegate channel 90 extending along a second channel axis CA2. The first channel axis CA1 and the second channel axis CA2 are both obliquely oriented with respect to the valve seat plane VSP such that the wastegate channel 52 and the valve element 62 are configured to direct exhaust gas to the catalytic converter 36. In such embodiments, the first channel axis CA1 defines a first channel axis angle CΘ1 obliquely oriented with respect to the valve seat plane VSP, and the second channel axis defines a second channel axis angle CΘ2 obliquely oriented with respect to the valve seat plane VSP. In embodiments where there is not a dividing portion 92, the wastegate duct 50 extends along the channel axis CA, and the channel axis CA is obliquely oriented with respect to the VSP to define the channel angle CΘ. As described above, the channel angle CΘ may be any suitable angle that is not normal, i.e., 90 degrees with respect to the spindle axis SA. By non-limiting example, the channel angle CΘ may be between 100 and 170 degrees. By another non-limiting example, the channel angle CΘ may be 110 degrees. By another non-limiting example, the channel angle CΘ may be 120 degrees. By another non-limiting example, the channel angle CΘ may be 130 degrees. By another non-limiting example, the channel angle CΘ may be 140 degrees. By another non-limiting example, the channel angle CΘ may be 150 degrees. By another non-limiting example, the channel angle CΘ may be 160 degrees.

Similarly, when the first and second wastegate channels 88, 90 are present, the first channel axis angle CΘ1 and the second channel axis angle CΘ2 may be any suitable angle that is not normal, i.e., 90 degrees with respect to the spindle axis SA. By way of non-limiting example, the first channel axis angle CΘ1 and the second channel axis angle CΘ2 may be between 100 and 170 degrees. By another non-limiting example, the first channel axis angle CΘ1 and the second channel axis angle CΘ2 may be 110 degrees. By another non-limiting example, the first channel axis angle CΘ1 and the second channel axis angle CΘ2 may be 120 degrees. By another non-limiting example, the first channel axis angle CΘ1 and the second channel axis angle CΘ2 may be 130 degrees. By another non-limiting example, the first channel axis angle CΘ1 and the second channel axis angle CΘ2 may be 140 degrees. By another non-limiting example, the first channel axis angle CΘ1 and the second channel axis angle CΘ2 may be 150 degrees. By another non-limiting example, the first channel axis angle CΘ1 and the second channel axis angle CΘ2 may be 160 degrees. It is to be appreciated that the first channel axis angle CΘ1 and the second channel axis angle CΘ2 may define the same angle, or that the first channel axis angle CΘ1 and the second channel axis angle CΘ2 may define a different angle from one another.

A person having ordinary skill in the art will understand that suitable angles and orientations of the valve seat plane VSP, spindle axis SA, dividing plane DP, and/or channel axis CA will depend on the particular orientation and arrangement of the catalytic converter 36 relative to the turbocharger 38. Stated differently, the catalytic converter 36 may be arranged and oriented differently relative to the turbocharger 38 for different applications such that suitable angles and orientations for the valve seat plane VSP, spindle axis SA, dividing plane DP, and/or channel axis CA will have to be adjusted so that the exhaust gases are directed through the wastegate toward the center of the catalyst material.

In operation, the internal combustion engine 32 is activated causing exhaust gas to flow from the internal combustion engine 32 to the turbine housing inlet 46. The activation may occur by a manual method such as a user turning a key to activate the internal combustion engine 32, or may occur by an electronic method such as an electronic actuator activating the internal combustion engine 32. The valve element 62 begins in the first position where the valve body 64 is engaged with the valve seat 54 for preventing flow of the exhaust gas through the wastegate channel 52. When desired, the valve element 62 is moved from the first position to the second position where the valve body 64 is disengaged with the valve seat 54 for allowing flow of exhaust gas through the wastegate channel 52. As described above, the movement of the valve element 62 from the first position to the second position may be actuated by the wastegate arm 66 which is configured to rotate allowing the valve element 62 to move to the second position.

Having the channel axis CA is obliquely oriented with respect to the valve seat plane VSP allows the flow of exhaust gas to flow obliquely with respect to the valve seat plane VSP, which results in the exhaust gas being targeted to a specific area of the exhaust system 34, for example the catalytic converter 36. Additionally, having the channel axis CA being obliquely oriented with respect to the valve seat plane VSP allows more freedom to target a center of the catalyst by reducing the impact of manufacturing constraints. In other words, the flow of exhaust gas through the wastegate channel 52 is able to be skewed without having to reposition the entire wastegate assembly 60 and wastegate duct 50, which results in reducing manufacturing constraints of the wastegate assembly 60 all while increasing efficiency in vehicle emissions.

Figure 8:
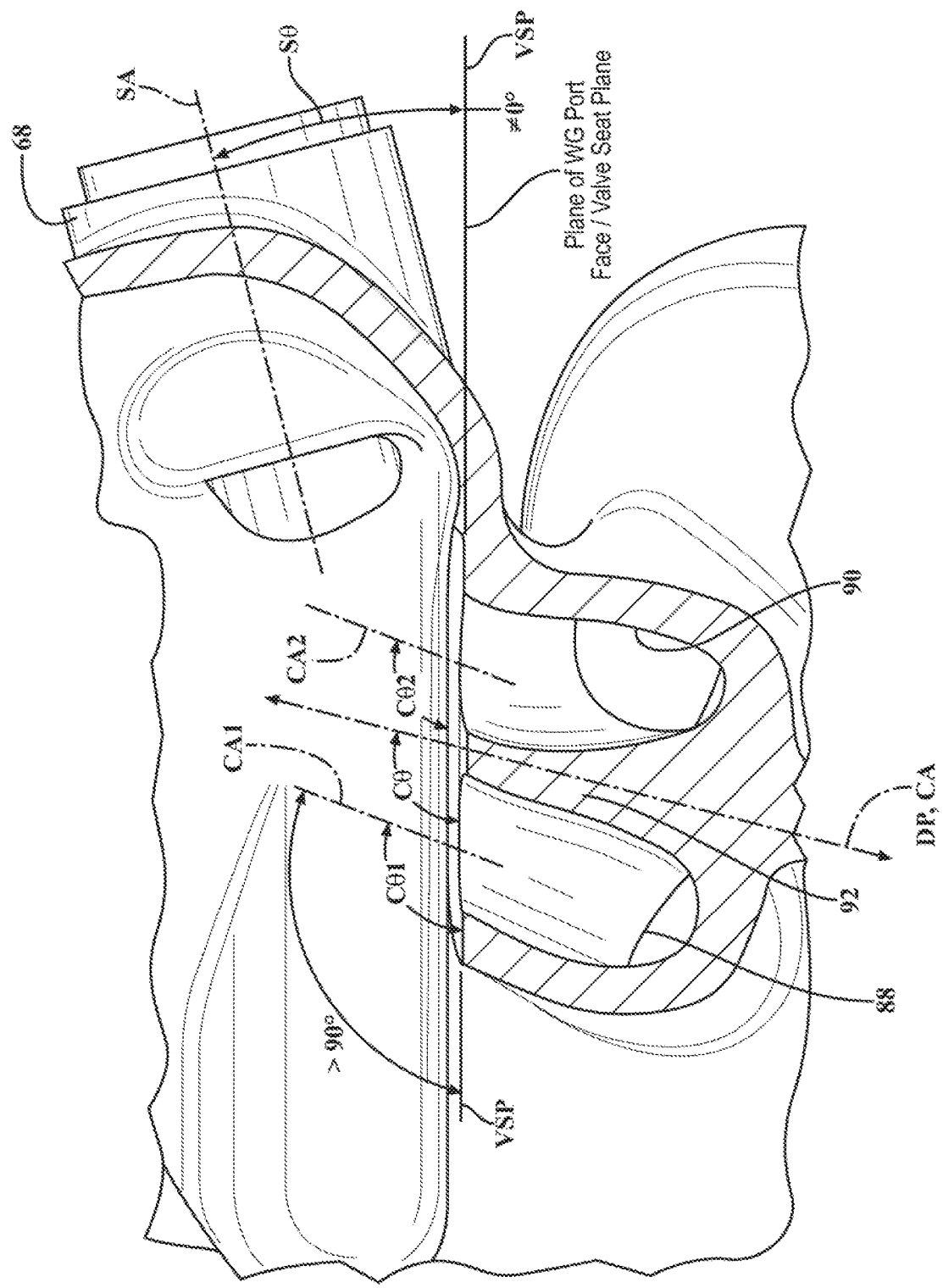
FIG. 8 is a side cross-sectional view of the wastegate duct and the wastegate assembly, with the wastegate duct defining the first wastegate channel and the second wastegate channel and divided by the dividing portion, with the dividing portion, the first wastegate channel, and the second wastegate channel being obliquely oriented with respect to the spindle axis, and with the valve seat plane being obliquely oriented with respect to the spindle axis.

It is to be appreciated that the valve seat plane VSP may be obliquely oriented with respect to the spindle axis SA, the channel axis CA may be obliquely oriented with respect to the valve seat plane VSP, and/or the channel axis CA may be obliquely oriented with respect to the spindle axis SA in the same embodiment. For example, as shown in FIG. 8, the valve seat plane VSP is obliquely oriented with respect to the spindle axis SA, the channel axis CA is obliquely oriented with respect to the valve seat plane VSP, and the channel axis CA is obliquely oriented with respect to the spindle axis SA. Also, in some embodiments, the valve seat plane VSP is obliquely oriented with respect to the spindle axis SA and the channel axis CA is obliquely oriented with respect to the valve seat plane VSP. In other embodiments, the channel axis CA is obliquely oriented with respect to the valve seat plane VSP and the channel axis CA is obliquely oriented with respect to the spindle axis SA. In other embodiments, the channel axis CA is obliquely oriented with respect to the spindle axis SA and the valve seat plane VSP is obliquely oriented with respect to the spindle axis SA.

Statement 1. A turbocharger for receiving exhaust gas from an internal combustion engine of a vehicle and for delivering compressed air to the internal combustion engine, with the vehicle including a catalytic converter, said turbocharger comprising:
  a turbine housing comprising:
    an interior surface defining a turbine housing interior, said interior surface extending between:
      a turbine housing inlet defined at one end of said interior surface and in fluid communication with the internal combustion engine and said turbine housing interior for delivering exhaust gas from the internal combustion engine to said turbine housing interior, and
      a turbine housing outlet defined at an opposite end of said interior surface and in fluid communication with said turbine housing interior for discharging exhaust gas from said turbine housing interior, and
    a wastegate duct disposed downstream of said turbine housing inlet and defining a wastegate channel in fluid communication with said turbine housing inlet for discharging exhaust gas from said turbine housing inlet by bypassing said turbine housing interior;
  a valve seat disposed about said wastegate channel at a wastegate channel outlet of said wastegate channel, with said valve seat having a valve seat plane extending along said valve seat; and
  a wastegate assembly for controlling exhaust gas flow to said turbine housing interior, said wastegate assembly comprising,
    a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior,
    a spindle coupled to said wastegate arm of said valve element for moving said valve element between said first and second positions, with said spindle extending along a spindle axis;
  wherein said valve seat plane is obliquely oriented with respect to said spindle axis such that said wastegate channel and said valve element are configured to direct exhaust gas to the catalytic converter.

Statement 2. The turbocharger as set forth in statement 1, wherein said valve seat plane and said spindle axis defines a spindle angle when said valve element is in said first position such that said valve body is engaged with said valve seat, wherein said spindle angle is between 10 and 80 degrees.

Statement 3. The turbocharger as set forth in statement 2, wherein said spindle angle is between 20 and 70 degrees.

Statement 4. The turbocharger as set forth in any one of the preceding statements, wherein said valve body has a body surface facing said valve seat and engageable with said valve seat, wherein said body surface has a body plane extending along said body surface, and wherein said body plane is parallel with said valve seat plane when said valve element is in said first position.

Statement 5. The turbocharger as set forth in any one of the preceding statements, wherein said valve body has a body surface facing said valve seat and engageable with said valve seat, wherein said body surface has a body plane extending along said body surface, and wherein said body plane is obliquely oriented with respect to said spindle axis when said valve element is in said second position.

Statement 6. The turbocharger as set forth in any one of the preceding statements, wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, and wherein said valve seat is disposed about said first and second wastegate channels at respective channel outlets of said first and second wastegate channels.

Statement 7. The turbocharger as set forth in any one of the preceding statements, further comprising an actuator coupled to said spindle for moving said spindle to move said valve element between said first and second positions.

Statement 8. The turbocharger as set forth any one the preceding statements, further comprising a bearing housing coupled to said turbine housing and defining a bearing housing interior, a compressor housing coupled to said bearing housing and defining a compressor housing interior, a turbine wheel disposed in said turbine interior, a shaft rotatably coupled to said turbine wheel and disposed in said bearing housing interior, and a compressor wheel rotatably coupled to said shaft.

Statement 9. A system for a vehicle, said system comprising:
 an internal combustion engine which produces exhaust gas;
 an exhaust system configured to deliver the exhaust gas out of the vehicle;
 a catalytic converter disposed between said internal combustion engine and said exhaust system; and
 a turbocharger for receiving exhaust gas from said internal combustion engine and for delivering compressed air to the internal combustion engine, said turbocharger comprising,
  a turbine housing comprising:
   an interior surface defining a turbine housing interior, said interior surface extending between:
    a turbine housing inlet defined at one end of said interior surface and in fluid communication with the internal combustion engine and said turbine housing interior for delivering exhaust gas from the internal combustion engine to said turbine housing interior, and
    a turbine housing outlet defined at an opposite end of said interior surface and in fluid communication with said turbine housing interior for discharging exhaust gas from said turbine housing interior, and
   a wastegate duct disposed downstream of said turbine housing inlet and defining a wastegate channel in fluid communication with said turbine housing inlet for discharging exhaust gas from said turbine housing inlet by bypassing said turbine housing interior;
  a valve seat disposed about said wastegate channel at a wastegate channel outlet of said wastegate channel, with said valve seat having a valve seat plane extending along said valve seat; and
  a wastegate assembly for controlling exhaust gas flow to said turbine housing interior, said wastegate assembly comprising,
   a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior,
   a spindle coupled to said wastegate arm of said valve element for moving said valve element between said first and second positions, with said spindle extending along a spindle axis;
  wherein said valve seat plane is obliquely oriented with respect to said spindle axis such that said wastegate channel and said valve element are configured to direct exhaust gas to said catalytic converter.

Statement 10. A turbocharger for receiving exhaust gas from an internal combustion engine of a vehicle and for delivering compressed air to the internal combustion engine, with the vehicle including a catalytic converter, said turbocharger comprising:
 a turbine housing comprising:
  an interior surface defining a turbine housing interior, said interior surface extending between:
   a turbine housing inlet defined at one end of said interior surface and in fluid communication with the internal combustion engine and said turbine housing interior for delivering exhaust gas from the internal combustion engine to said turbine housing interior, and
   a turbine housing outlet defined at an opposite end of said interior surface and in fluid communication with said turbine housing interior for discharging exhaust gas from said turbine housing interior, and
  a wastegate duct disposed downstream of said turbine housing inlet and defining a wastegate channel in fluid communication with said turbine housing inlet for discharging exhaust gas from said turbine housing inlet by bypassing said turbine housing interior;
 a valve seat disposed about said wastegate channel at a wastegate channel outlet of said wastegate channel, with said valve seat having a valve seat plane extending along said valve seat; and
 a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior;

wherein said wastegate channel extends along a channel axis, and wherein said channel axis is obliquely oriented with respect to said valve seat plane such that said wastegate channel and said valve element are configured to direct exhaust gas to the catalytic converter.

Statement 11. The turbocharger as set forth in statement 10, wherein said channel axis and said valve seat plane define a channel angle, and wherein said channel angle is between 100 and 170 degrees.

Statement 12. The turbocharger as set forth in statement 11, wherein said channel angle is between 110 and 160 degrees.

Statement 13. The turbocharger as set forth in any one of statements 10-12, wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, and wherein said valve seat is disposed about said first and second wastegate channels at respective channel outlets of said first and second wastegate channels.

Statement 14. The turbocharger as set forth in statement 13, wherein said channel axis is further defined as a first channel axis and extends along said first wastegate channel, wherein said second wastegate channel extends along a second channel axis, and wherein said first channel axis and said second channel axis are both obliquely oriented with respect to said valve seat plane such that said wastegate channel and said valve element are configured to direct exhaust gas to the catalytic converter.

Statement 15. The turbocharger as set forth in any one of statements 10-14, wherein said wastegate assembly further comprises a spindle coupled to said wastegate arm of said valve element for moving said valve element between said first and second positions.

Statement 16. The turbocharger as set forth in statement 15, further comprising an actuator coupled to said spindle for moving said spindle to move said valve element between said first and second positions.

Statement 17. The turbocharger as set forth in any one of statements 10-16, further comprising a bearing housing coupled to said turbine housing and defining a bearing housing interior, a compressor housing coupled to said bearing housing and defining a compressor housing interior, a turbine wheel disposed in said turbine interior, a shaft rotatably coupled to said turbine wheel and disposed in said bearing housing interior, and a compressor wheel rotatably coupled to said shaft.

Statement 18. A system for a vehicle, said system comprising:
an internal combustion engine which produces exhaust gas;
an exhaust system configured to deliver the exhaust gas out of the vehicle;
a catalytic converter disposed between said internal combustion engine and said exhaust system; and
a turbocharger for receiving exhaust gas from said internal combustion engine and for delivering compressed air to the internal combustion engine, said turbocharger comprising,
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and
a wastegate duct disposed downstream of said turbine housing inlet and defining a wastegate channel in fluid communication with said turbine housing inlet for discharging exhaust gas from said turbine housing inlet by bypassing said turbine housing interior;
a valve seat disposed about said wastegate channel at a wastegate channel outlet of said wastegate channel, with said valve seat having a valve seat plane extending along said valve seat; and
a wastegate assembly for controlling exhaust gas flow to said turbine housing interior, said wastegate assembly comprising,
a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior;
wherein said wastegate channel extends along a channel axis, and wherein said channel axis is obliquely oriented with respect to said valve seat plane such that said wastegate channel and said valve element are configured to direct exhaust gas to said catalytic converter.

Statement 19. A turbocharger for receiving exhaust gas from an internal combustion engine of a vehicle and for delivering compressed air to the internal combustion engine, with the vehicle including a catalytic converter, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis;

wherein said wastegate channel extends along a channel axis, and wherein said channel axis is obliquely oriented with respect to said spindle axis such that said wastegate channel and said valve element are configured to direct exhaust gas to the catalytic converter.

Statement 20. The turbocharger as set forth in statement 19, wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, wherein said channel axis is further defined as a first channel axis and extends along said first wastegate channel, wherein said second wastegate channel extends along a second channel axis, and wherein said first channel axis and said second channel axis are both obliquely oriented with respect to said spindle axis such that said wastegate channel and said valve element are configured to direct exhaust gas to the catalytic converter.

Statement 21. The turbocharger as set forth in statement 20, further comprising a dividing portion that divides said first and second wastegate channels, wherein said dividing portion extends along a dividing plane DP that is obliquely oriented with respect to said spindle axis SA.

Statement 22. A system for a vehicle, said system comprising:

an internal combustion engine which produces exhaust gas;

an exhaust system configured to deliver the exhaust gas out of the vehicle;

a catalytic converter disposed between said internal combustion engine and said exhaust system; and a turbocharger for receiving exhaust gas from said internal combustion engine and for delivering compressed air to the internal combustion engine, said turbocharger comprising, a turbine housing comprising:

an interior surface defining a turbine housing interior, said interior surface extending between:

a turbine housing inlet defined at one end of said interior surface and in fluid communication with the internal combustion engine and said turbine housing interior for delivering exhaust gas from the internal combustion engine to said turbine housing interior, and a turbine housing outlet defined at an opposite end of said interior surface and in fluid communication with said turbine housing interior for discharging exhaust gas from said turbine housing interior, and a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis;

wherein said wastegate channel extends along a channel axis, and wherein said channel axis is obliquely oriented with respect to said spindle axis such that said wastegate channel and said valve element are configured to direct exhaust gas to said catalytic converter.

What is claimed is:

1. A turbocharger for receiving exhaust gas from an internal combustion engine of a vehicle and for delivering compressed air to the internal combustion engine, with the vehicle including a catalytic converter, said turbocharger comprising:

a turbine housing comprising:

an interior surface defining a turbine housing interior, said interior surface extending between:

a turbine housing inlet defined at one end of said interior surface and in fluid communication with the internal combustion engine and said turbine housing interior for delivering exhaust gas from the internal combustion engine to said turbine housing interior, and a turbine housing outlet defined at an opposite end of said interior surface and in fluid communication with said turbine housing interior for discharging exhaust gas from said turbine housing interior, and a wastegate duct disposed downstream of said turbine housing inlet and defining a wastegate channel in fluid communication with said turbine housing inlet for discharging exhaust gas from said turbine housing inlet by bypassing said turbine housing interior;
a valve seat disposed about said wastegate channel at a wastegate channel outlet of said wastegate channel, with said valve seat having a valve seat plane extending along said valve seat; and
a wastegate assembly for controlling exhaust gas flow to said turbine housing interior, said wastegate assembly comprising,
a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior;
wherein said wastegate channel extends along a channel axis, and wherein said channel axis is obliquely oriented with respect to said valve seat plane such that said wastegate channel and said valve element are configured to direct exhaust gas to the catalytic converter;
wherein said wastegate channel is further defined as a first wastegate channel extending along a first channel axis that is obliquely oriented with respect to said valve seat plane and a second wastegate channel extending along a second channel axis that is obliquely oriented with respect to said valve seat plane, and wherein said valve seat is disposed about said first and second wastegate channels at respective channel outlets of said first and second wastegate channels;
wherein said wastegate assembly further comprises a spindle coupled to said wastegate arm of said valve element for moving said valve element between said first and second positions, with said spindle extending along a spindle axis;
wherein said valve seat plane is obliquely oriented with respect to said spindle axis such that said wastegate channel and said valve element are configured to direct exhaust gas to the catalytic converter;
wherein said first channel axis and said valve seat plane define a first channel axis angle, wherein said second channel axis and said valve seat plane define a second channel axis angle, wherein said valve seat plane and said spindle axis define a spindle angle, wherein said first and second channel axis angles are between 100 and 170 degrees, and wherein said spindle angle is between 1 and 80 degrees; and
a wastegate arm extending from said valve body to said valve seat plane where it connects to said spindle.

2. The turbocharger as set forth in claim 1, wherein said channel axis is further defined as a first channel axis and extends along said first wastegate channel, wherein said second wastegate channel extends along a second channel axis, and wherein said first channel axis and said second channel axis are both obliquely oriented with respect to said valve seat plane such that said wastegate channel and said valve element are configured to direct exhaust gas to the catalytic converter.

3. The turbocharger as set forth in claim 1, further comprising a dividing portion that divides said first and second wastegate channels, wherein said dividing portion extends along a dividing plane that is obliquely oriented with respect to said spindle axis.

4. The turbocharger as set forth in claim 1, further comprising an actuator coupled to said spindle for moving said spindle to move said valve element between said first and second positions.

5. The turbocharger as set forth in claim 1, wherein said channel axis is obliquely oriented with respect to said spindle axis such that said wastegate channel and said valve element are configured to direct exhaust gas to the catalytic converter.

6. The turbocharger as set forth in claim 1, wherein said valve body has a body surface facing said valve seat and engageable with said valve seat, wherein said body surface has a body plane extending along said body surface, and wherein said body plane is obliquely oriented with respect to said spindle axis when said valve element is in said second position.

7. The turbocharger as set forth in claim 1, wherein said valve body has a body surface facing said valve seat and engageable with said valve seat, wherein said body surface has a body plane extending along said body surface, and wherein said body plane is parallel with said valve seat plane when said valve element is in said first position.

8. The turbocharger as set forth in claim 1, further comprising a bearing housing coupled to said turbine housing and defining a bearing housing interior, a compressor housing coupled to said bearing housing and defining a compressor housing interior, a turbine wheel disposed in said turbine interior, a shaft rotatably coupled to said turbine wheel and disposed in said bearing housing interior, and a compressor wheel rotatably coupled to said shaft.

9. A system for a vehicle, said system comprising:
said internal combustion engine which produces exhaust gas;
an exhaust system configured to deliver the exhaust gas out of the vehicle;
said catalytic converter disposed between said internal combustion engine and said exhaust system; and
said turbocharger as set forth in claim 1.

10. The turbocharger as set forth in claim 1, wherein said first channel axis angle and said second channel axis angle define the same angle.

11. A turbocharger for receiving exhaust gas from an internal combustion engine of a vehicle and for delivering compressed air to the internal combustion engine, with the vehicle including a catalytic converter, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and
a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis; and wherein said valve seat plane is obliquely oriented with respect to said spindle axis such that said wastegate channel and said valve element are configured to direct exhaust gas to the catalytic converter; and wherein said valve seat plane and said spindle axis define a spindle angle between 1 and 80 degrees; and a wastegate arm extending from said valve body to said valve seat plane where it connects to said spindle.

12. The turbocharger as set forth in claim 11, wherein said valve body has a body surface facing said valve seat and engageable with said valve seat, wherein said body surface has a body plane extending along said body surface, and wherein said body plane is parallel with said valve seat plane when said valve element is in said first position.

13. The turbocharger as set forth in claim 11, wherein said valve body has a body surface facing said valve seat and engageable with said valve seat, wherein said body surface has a body plane extending along said body surface, and wherein said body plane is obliquely oriented with respect to said spindle axis when said valve element is in said second position.

14. The turbocharger as set forth in claim 11, wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, and wherein said valve seat is disposed about said first and second wastegate channels at respective channel outlets of said first and second wastegate channels.

15. The turbocharger as set forth in claim 11, further comprising an actuator coupled to said spindle for moving said spindle to move said valve element between said first and second positions.

16. The turbocharger as set forth in claim 11, further comprising a bearing housing coupled to said turbine housing and defining a bearing housing interior, a compressor housing coupled to said bearing housing and defining a compressor housing interior, a turbine wheel disposed in said turbine interior, a shaft rotatably coupled to said turbine wheel and disposed in said bearing housing interior, and a compressor wheel rotatably coupled to said shaft.

17. The turbocharger as set forth in claim 11, wherein said valve body has a body surface facing said valve seat and engageable with said valve seat, wherein said body surface has a body plane extending along said body surface, and wherein said body plane is parallel with said valve seat plane when said valve element is in said first position; and wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, and wherein said valve seat is disposed about said first and second wastegate channels at respective channel outlets of said first and second wastegate channels.

18. A system for a vehicle, said system comprising:
said internal combustion engine which produces exhaust gas;
an exhaust system configured to deliver the exhaust gas out of the vehicle;
said catalytic converter disposed between said internal combustion engine and said exhaust system; and
said turbocharger as set forth in claim 13.

19. A turbocharger for receiving exhaust gas from an internal combustion engine of a vehicle and for delivering compressed air to the internal combustion engine, with the vehicle including a catalytic converter, said turbocharger comprising:

a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and
a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis;

wherein said wastegate channel extends along a channel axis, and wherein said channel axis is obliquely oriented with respect to said spindle axis such that said wastegate channel and said valve element are configured to direct exhaust gas to the catalytic converter;
wherein said valve seat plane is obliquely oriented with respect to said spindle axis such that said wastegate channel and said valve element are configured to direct exhaust gas to the catalytic converter;
wherein said valve seat plane and said spindle axis define a spindle angle between 1 and 80 degrees; and
wherein said channel axis and said spindle axis define an angle between one another that is greater than 90 degrees; and
a wastegate arm extending from said valve body to said valve seat plane where it connects to said spindle.

20. The turbocharger as set forth in claim 19, wherein said wastegate channel is further defined as a first wastegate channel, wherein said wastegate duct further defines a second wastegate channel in fluid communication with said turbine housing inlet for discharging exhaust gas from said turbine housing inlet by bypassing said turbine housing interior, wherein said channel axis is further defined as a first channel axis and extends along said first wastegate channel, wherein said second wastegate channel extends along a second channel axis, and wherein said first channel axis and said second channel axis are both define an angle with-said spindle axis that is greater than 90 degrees such that said wastegate channel and said valve element are configured to direct exhaust gas to the catalytic converter.

21. The turbocharger as set forth in claim 20, further comprising a dividing portion that divides said first and second wastegate channels, wherein said dividing portion extends along a dividing plane that is obliquely oriented with respect to said spindle axis.

22. A turbocharger for receiving exhaust gas from an internal combustion engine of a vehicle and for delivering compressed air to the internal combustion engine, with the vehicle including a catalytic converter, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and
a wastegate duct disposed downstream of said turbine housing inlet and defining a wastegate channel in fluid communication with said turbine housing inlet for discharging exhaust gas from said turbine housing inlet by bypassing said turbine housing interior;
a valve seat disposed about said wastegate channel at a wastegate channel outlet of said wastegate channel, with said valve seat having a valve seat plane extending along said valve seat; and
a wastegate assembly for controlling exhaust gas flow to said turbine housing interior, said wastegate assembly comprising,
a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior;
wherein said wastegate channel extends along a channel axis, and wherein said channel axis is obliquely oriented with respect to said valve seat plane such that said wastegate channel and said valve element are configured to direct exhaust gas to the catalytic converter;
wherein said wastegate channel is further defined as a first wastegate channel extending along a first channel axis that is obliquely oriented with respect to said valve seat plane and a second wastegate channel extending along a second channel axis that is obliquely oriented with respect to said valve seat plane, and wherein said valve seat is disposed about said first and second wastegate channels at respective channel outlets of said first and second wastegate channels;
wherein said wastegate assembly further comprises a spindle coupled to said wastegate arm of said valve element for moving said valve element between said first and second positions, with said spindle extending along a spindle axis;
wherein said valve seat plane is obliquely oriented with respect to said spindle axis such that said wastegate channel and said valve element are configured to direct exhaust gas to the catalytic converter;
wherein said first channel axis and said valve seat plane define a first channel axis angle, wherein said second channel axis and said valve seat plane define a second channel axis angle, wherein said valve seat plane and said spindle axis define a spindle angle, wherein said first and second channel axis angles are between 100 and 170 degrees, and wherein said spindle angle is between 1 and 80 degrees; and
wherein a rotational center of said spindle is disposed below said valve seat plane on a first channel side.

23. The turbocharger as set forth in claim 22 further comprising a wastegate arm extending from said valve body to said valve seat plane where it connects to said spindle.

24. A turbocharger for receiving exhaust gas from an internal combustion engine of a vehicle and for delivering compressed air to the internal combustion engine, with the vehicle including a catalytic converter, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior, and
a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis; and wherein said valve seat plane is obliquely oriented with respect to said spindle axis such that said wastegate channel and said valve element are configured to direct exhaust gas to the catalytic converter; and wherein said valve seat plane and said spindle axis define a spindle angle between 1 and 80 degrees; and wherein a rotational center of said spindle is disposed below said valve seat plane on a first channel side.

25. The turbocharger as set forth in claim 24 further comprising a wastegate arm extending from said valve body to said valve seat plane where it connects to said spindle.

26. A turbocharger for receiving exhaust gas from an internal combustion engine of a vehicle and for delivering compressed air to the internal combustion engine, with the vehicle including a catalytic converter, said turbocharger comprising:

a turbine housing comprising:

an interior surface defining a turbine housing interior, said interior surface extending between:

a turbine housing inlet defined at one end of said interior surface and in fluid communication with the internal combustion engine and said turbine housing interior for delivering exhaust gas from the internal combustion engine to said turbine housing interior, and a turbine housing outlet defined at an opposite end of said interior surface and in fluid communication with said turbine housing interior for discharging exhaust gas from said turbine housing interior, and a wastegate duct disposed downstream of said turbine housing inlet and defining a wastegate channel in fluid communication with said turbine housing inlet for discharging exhaust gas from said turbine housing inlet by bypassing said turbine housing interior;

a valve seat disposed about said wastegate channel at a wastegate channel outlet of said wastegate channel, with said valve seat having a valve seat plane extending along said valve seat; and a wastegate assembly for controlling exhaust gas flow to said turbine housing interior, said wastegate assembly comprising, a valve element engageable with said valve seat, with said valve element having a valve body and a wastegate arm extending away from said valve body, with said valve element moveable between a first position where said valve body is engaged with said valve seat for preventing exhaust gas flow from said turbine housing inlet to bypass said turbine housing interior, and a second position where said valve body is disengaged with said valve seat for allowing exhaust gas flow from said turbine housing inlet to bypass said turbine housing interior, a spindle coupled to said wastegate arm of said valve element for moving said valve element between said first and second positions, with said spindle extending along a spindle axis;

wherein said wastegate channel extends along a channel axis, and wherein said channel axis is obliquely oriented with respect to said spindle axis such that said wastegate channel and said valve element are configured to direct exhaust gas to the catalytic converter;

wherein said valve seat plane is obliquely oriented with respect to said spindle axis such that said wastegate channel and said valve element are configured to direct exhaust gas to the catalytic converter;

wherein said valve seat plane and said spindle axis define a spindle angle between 1 and 80 degrees; and wherein said channel axis and said spindle axis define an angle between one another that is greater than 90 degrees; and wherein a rotational center of said spindle is disposed below said valve seat plane on a first channel side.

27. The turbocharger as set forth in claim 26 further comprising a wastegate arm extending from said valve body to said valve seat plane where it connects to said spindle.

* * * * *